United States Patent
Parola et al.

(10) Patent No.: US 9,056,303 B2
(45) Date of Patent: Jun. 16, 2015

(54) METHOD FOR THE CONTINUOUS PREPARATION OF A CATALYTIC SYSTEM THAT IS USED TO POLYMERIZE A CONJUGATED DIENE AND INSTALLATION FOR IMPLEMENTING SAME

(75) Inventors: Helene Parola, Chamalieres (FR); Fanny Barbotin, Grenoble (FR); Pierre Kiener, Gerzat (FR); Bernard Anselme, Pont-du-Chateau (FR); Fabrice Martinet, Brive-la-Gaillarde (FR)

(73) Assignees: COMPAGNIE GENERALE DES ETABLISSEMENTS, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1237 days.

(21) Appl. No.: 12/083,929

(22) PCT Filed: Oct. 16, 2006

(86) PCT No.: PCT/EP2006/009959
§ 371 (c)(1),
(2), (4) Date: Mar. 6, 2009

(87) PCT Pub. No.: WO2007/045417
PCT Pub. Date: Apr. 26, 2007

(65) Prior Publication Data
US 2009/0182106 A1   Jul. 16, 2009

(30) Foreign Application Priority Data
Oct. 19, 2005   (FR) ..................... 05 10796

(51) Int. Cl.
*C08F 36/00* (2006.01)
*C08F 4/44* (2006.01)
(Continued)

(52) U.S. Cl.
CPC .............. *B01J 19/20* (2013.01); *B01J 19/1862* (2013.01); *B01J 19/242* (2013.01); *B01J 2219/00094* (2013.01); *B01J 2219/00164* (2013.01); *C08F 36/04* (2013.01)

(58) Field of Classification Search
CPC ................................ C08F 136/00; B01J 23/00
USPC ...................................... 526/65, 335; 502/302
See application file for complete search history.

(56) References Cited

U.S. PATENT DOCUMENTS 4,699,960 A * 10/1987 Gordini et al. .................. 526/81
6,130,299 A * 10/2000 Sone et al. ....................... 526/89
(Continued)

OTHER PUBLICATIONS
International Search Report (ISR) in corresponding PCT/EP2006/009959 issued Jan. 4, 2007.
PCT/IB/304 and PCT/IB/308.

*Primary Examiner* — David W Wu
*Assistant Examiner* — Elizabeth Eng
(74) *Attorney, Agent, or Firm* — Dickinson Wright PLLC

(57) ABSTRACT

The present invention relates to a process for the continuous preparation of a catalytic system that can be used for the polymerization of at least one conjugated diene monomer, said catalytic system being based on at least:
a preforming conjugated diene;
an organic phosphoric acid salt of one or more rare-earth metal(s), said salt being in suspension in at least one saturated aliphatic or alicyclic and inert hydrocarbon-based solvent;
an alkylating agent comprising an alkylaluminium having the formula $AlR_3$ or $HAlR_2$; and
a halogen donor comprising an alkylaluminium halide;
characterized in that it comprises successively in one line (L): (i) a reaction between the preforming conjugated diene, with the solution of the salt of rare-earth element(s) and the alkylating agent, with the alkylation reaction being carried out for a characteristic minimum period of at least 5 minutes in an alkylation reactor (30) composed of at least one well-mixed dynamic mixer;
(ii) the addition of said halogen donor to the mixture obtained in (i), in order to produce a reaction for the halogenation-ageing of the preformed catalytic system and to continuously produce said preformed catalytic system at the outlet of said line (L).

34 Claims, 13 Drawing Sheets

(51) Int. Cl.
*C08F 136/00* (2006.01)
*B01J 31/00* (2006.01)
*B01J 23/00* (2006.01)
*B01J 19/20* (2006.01)
*B01J 19/18* (2006.01)
*B01J 19/24* (2006.01)
*C08F 36/04* (2006.01)

(56) References Cited

U.S. PATENT DOCUMENTS 6,838,534 B2 * 1/2005 Laubry .................. 526/153
2004/0009870 A1   1/2004 Laubry
2004/0019171 A1   1/2004 Laubry
2005/1013083     6/2005 Laubry et al.

* cited by examiner

| Catalyst | Mn (g/mol)/Ip | Microstructure (%) cis-1,4/trans-1,4/1,2 |
|---|---|---|
| MD1 | 191942/1.95 | 98.7/1/<0.5 |
| MD2 | 192239/2.23 | >98/<0.8/<0.5 |

| Catalyst | Mn (g/mol)/Ip | Microstructure (%) cis-1,4/trans-1,4/1,2 |
|---|---|---|
| MD1 | 223458/1.98 | >98/<0.8/<0.5 |
| MD3 | 222928/2.00 | >98/<0.8/<0.5 |

Table 3

| Catalyst | Mn (g/mol)/Ip | Microstructure (%) cis-1,4/trans-1,4/1,2 |
|---|---|---|
| MD4 | 217171/2.36 | >98.7/<0.8/<0.5 |

Table 4

| Catalyst | Mn (g/mol)/Ip | Microstructure (%) cis-1,4/trans-1,4/1,2 |
|---|---|---|
| D2 | 130013/1.74 | 97.4/2.4/<0.5 |
| MD5 | 73057/3.18 | 98.6/1.1/<0.5 |

Table 5

| Catalyst | Mn (g/mol)/Ip | Microstructure (%) cis-1,4/trans-1,4/1,2 |
|---|---|---|
| MD6 | 203007/2.22 | 98.8/0.9/<0.5 |
| MD7 | 138753/7.27 | >98.7/<0.8/≥0.5 |

Table 6

| Catalyst | Mn (g/mol)/Ip | Microstructure (%) cis-1,4/trans-1,4/3,4 |
|---|---|---|
| D3 | 272213/1.93 | 97.7/0.7/1.6 |
| MD6 | 250635/2.34 | 97.7/0.6/1.7 |

US 9,056,303 B2

METHOD FOR THE CONTINUOUS PREPARATION OF A CATALYTIC SYSTEM THAT IS USED TO POLYMERIZE A CONJUGATED DIENE AND INSTALLATION FOR IMPLEMENTING SAME

BACKGROUND

1. Field

The present disclosure relates to a process for the continuous preparation of a catalytic system that can be used for the polymerization of at least one conjugated diene monomer, and to an installation for implementing said process.

2. Description of Related Art

Patent documents WO-A-02/38636 and WO-A-03/097708 in the name of the applicants teach, in order to polymerize conjugated dienes, to use a "preformed" type catalytic system based on at least:

- a preforming conjugated diene, such as butadiene;
- an organic phosphoric acid salt of one or more rare-earth metals, which is in suspension in at least one saturated and aliphatic or alicyclic, and inert hydrocarbon-based solvent, this or these rare-earth metal(s) being present in said catalytic system in a concentration, for example, approximately equal to 0.02 mol/l and preferably ranging from 0.01 to 0.06 mol/l;
- an alkylating agent composed of an alkylaluminium having the formula $AlR_3$ or $HAlR_2$, in which R represents and alkyl radical, preferably of 1 to 8 carbon atoms, and H represents a hydrogen atom; and
- a halogen donor composed of an alkylaluminium halide.

The catalytic systems described in these documents are prepared in batch mode by implementing, in the same reactor, the following steps:

- in a first optional step of solvation, a suspension of said salt of rare-earth element(s) is prepared in said inert hydrocarbon-based solvent;
- in a second step, the conjugated diene is added to the suspension obtained in the first step or else, in the case where the first step has not been carried out, said solvent in addition to said conjugated diene is added to said salt;
- in a third step of alkylation, said alkylating agent is added to the suspension obtained at the end of said second step in order to obtain an alkylated salt;
- in a fourth step of halogenation, said halogen donor is added to said alkylated salt, producing a highly exothermic reaction of formation of a prepolymer of said conjugated diene; then
- in a fifth step of ageing, the mixture thus obtained is maintained at a constant temperature of approximately 60° C. for one to two hours, in order to obtain the preformed catalytic system, which is typically stored at a temperature of −15° C.

A major drawback of this process for preparing the preformed catalytic system in batch mode is that, in addition to the cycle time of several hours that it requires, if it is designed to increase the final concentration or rare-earth element(s) in the catalytic system, it is necessary to increase, in accordance with the latter, the concentration of preforming conjugated diene, thereby generating an increased exothermicity of the preformation step, this increased exothermicity being difficult to control and possibly detrimental to the activity of the catalytic system, or even to the safety of the installation.

This need to provide a relatively long cycle time for the synthesis of this catalytic system and a reduced concentration of rare-earth element(s) in said system, in order to minimize the abovementioned exothermicity, leads to this synthesis being carried out in a reactor having a relatively large volume.

Another drawback of this process for synthesis in batch mode lies in the difficulty in achieving good reproducibility of the catalytic systems obtained under given conditions, and also optimal coupling of this batch process with a polymerization carried out in continuous mode, for example in order to obtain polybutdiene or polyisoprene.

Patent document US-A-2004/0116638 mentions the possibility of preparing such catalytic systems, in continuous mode, by bringing into contact, in a feed line for feeding a polymerization reactor with conjugated diene, at a temperature ranging from −20 to 80° C., the preforming conjugated diene in solution with the alkylating agent, then the alkylation product thus obtained with the salt of rare-earth element(s), then finally the halogen donor, the preformed catalytic system resulting therefrom being introduced into the reactor in continuous mode within a period of less than 10 minutes starting from the addition of the halogen donor.

It will be noted that the latter document does not describe, in its single example, the implementation of such a continuous-mode synthesis of the catalytic system, but describes a synthesis of polydienes, the essential characteristic of which consists in maintaining, in the continuous-mode reactor, a non-ideal flow stream of the constituents so as to ensure that 10% of the constituents entering the reactor at a given reference time are present in the continuous-mode reactor at a time $t_1$ which is different from the initial residence time.

SUMMARY

There exists a need to have a process for the continuous preparation of a catalytic system based on salts of rare-earth metal(s) for the polymerization of at least one conjugated diene, and in particular for the continuous feeding of a polymerization reactor with at least one conjugated diene, from where the polymer is continuously recovered.

An objective of embodiments of the present invention is to remedy the abovementioned drawbacks relating to the process for preparing the preformed catalytic system in batch mode, by implementing a process for the continuous preparation of a catalytic system for the preferably continuous polymerization of at least on conjugated diene monomer, said catalytic system being based on at least:

- a preforming conjugated diene;
- an organic phosphoric acid salt of one or more rare-earth metal(s) (metals having an atomic number between 57 and 71 in Mendeleev's Periodic Table of Elements), said salt being in solution in at least one saturated and aliphatic or alicyclic, and inert hydrocarbon-based solvent;
- an alkylating agent comprising an alkylaluminium having the formula $AlR_3$ or $HAlR_2$, in which R represents an alkyl radical, preferably of 1 to 12 carbon atoms, and H represents a hydrogen atom; and
- a halogen donor comprising an alkylaluminium halide, and characterized in that it comprises successively in one feed line (L) for a polymerization reactor, preferably operating in continuous mode,
  (i) reacting, in an alkylation reactor composed of one or more dynamic mixer(s) of perfectly stirred type, said preforming conjugated diene, said solution of rare-earth element(s) and said alkylating agent, and carrying out the alkylation reaction for a characteristic minimal period of time of at least 5 minutes, then
  (ii) adding said halogen donor to the product of the reaction obtained in the alkylation step (i), in order to produce a reaction for the halogenation-ageing of the preformed catalytic system resulting from the halogenation, and to continuously produce said preformed catalytic system at the outlet of said line (L).

The expression "reaction product" is understood to mean the mixture of the constituents or the product of reaction of the constituents or a mixture of the two.

In the context of the continuous process according to embodiments of the invention, the line (L) is the feed line for the installation which goes from a reactor for dissolving the salt of rare-earth element(s) or from a storage reservoir for storing the solution of salt of rare-earth element(s) to the inlet of a polymerization reactor, preferably in continuous mode, for polymerizing at least one conjugated diene monomer.

The continuous process according to embodiments of the invention makes it possible to obtain, at the outlet of said line (L), a catalytic system which is based on said conjugated diene, said salt, said solvent, said alkylating agent and said halogen donor, and which can be used for the preferably continuous polymerization, in an industrial unit, of at least one conjugated diene monomer with an activity and advantageous microstructural and macrostructural characteristics of the elastomers obtained, which are similar to those provided by the preformed catalytic systems synthesized in batch mode according to the abovementioned documents WO-A-02/38636 and WO-A-03/097708.

It will be noted that the use, in this process according to embodiments of the invention, as alkylation reactor, of one or more dynamic mixer(s) of perfectly stirred type makes it possible to continuously prepare the catalytic system since there is no formation of an uncontrollable "gel" liable to clog the alkylation reactor and/or the line (L) and to cause the process for preparing said catalytic system to be interrupted after a few hours, or even after several days or months.

It will be noted that this process according to embodiments of the invention for the continuous synthesis of the catalytic system makes it possible to satisfactorily control the exothermicity of the abovementioned preformation step, even in the case of a relatively high final concentration of rare-earth element(s) in the catalytic system, due to the fact that this exothermicity can be controlled in a continuous process by means of a better distribution of heat exchanges.

This process also has the advantage of offering a gain in flexibility since the alkylating agent/salt of rare-earth element(s) ratio, directly correlated to the catalytic activity, can be readily varied. The same is true with respect to the possibility of modulating as desired the flow rate of the outlet of the catalytic system at the line outlet, while at the same time remaining within the residence time range which is suitable for each of the alkylation and halogenation-ageing steps.

In general, this catalytic system comprises said rare-earth element(s), such as neodymium, in a concentration equal to or ranging from 0.002 mol/l to 0.08 mol/l and preferably ranging from 0.02 mol/l to 0.07 mol/l.

In fact, tests carried out by the applicants have established that, surprisingly, the final concentration of rare-earth element(s) in said catalytic system, such as neodymium, may be advantageously greater than 0.02 mol/l and even more advantageously approximately equal to 0.04 mol/l. The process for continuous synthesis according to the invention makes it possible to carry out the process at high final concentrations of rare-earth element(s) which can be modulated according to the parameters to be taken into consideration. The process for the continuous synthesis of the catalytic system according to embodiments of the invention makes it possible to control the concentration of salt of rare-earth element(s) and, consequently, the catalytic activity according, for example, to the level of impurities present in the solvent and/or the monomer(s).

It will also be noted that this control of the exothermicity during ageing, together with the relatively short synthesis time which characterizes the continuous synthesis of the catalytic system according to embodiments of the invention, makes it possible to carry out this synthesis in reactors with relatively small volumes, in comparison with the volumes used to date for batch-mode reactors with an identical production capacity. The initial expenditure is therefore less than that of a unit for synthesis of the catalytic system in batch mode and the solvent requirements are themselves also lower due to a greater concentration of the catalytic system. Since a continuous synthesis is, due to the fact that it operates continually, largely more productive than a batch-mode synthesis, it is easy to understand the gain in cost-effectiveness that embodiments of the invention makes it possible to achieve.

It will also be noted that this continuous synthesis of the catalytic system according to embodiments of the invention makes it possible to readily control the temperature and the contact time between the constituents, advantageously the temperature and the time characteristic of the alkylation step and/or the temperature and/or the time of the halogenation-ageing step, while at the same time thus ensuring that the implementation of the process for the continuous preparation of the preformed catalytic system according to the invention shows good flexibility.

It will also be noted that this continuous synthesis according to embodiments of the invention makes it possible to ensure good reproducibility of the characteristics of the catalytic systems obtained under given conditions and, consequently, of the activity of the latter for the polymerizations envisaged.

By way of preforming conjugated diene that can be used to "preform" said catalytic system, mention may be made of 1,3-butadiene, isoprene or a mixture thereof, and preferably 1,3-butadiene.

It will be noted that the molar ratio (preforming monomer/salt of rare-earth element(s)) may have a value ranging from 15 to 70.

The salt of rare-earth element(s) that is reacted with the preforming conjugated diene is used in the form of a more or less viscous solution and which may comprise free acid according to the preparation conditions known, moreover, per se.

The salt of rare-earth element(s) can be prepared either continuously, or in batch mode as described in patent document WO-A-02/38636, with a view to continuous feeding of the feed line (L). When the salt of one or more rare earth metal(s) is in the form of a non-hygroscopic powder, the solubilization time in the solvent is variable according to the solubilization conditions used.

Thus, according to a first embodiment, the salt of rare-earth element(s) in the form of a non-hygroscopic powder which has a slight tendency to agglomerate at ambient temperature is solubilized in a low-molecular-weight, aliphatic or alicyclic, and inert hydrocarbon-based solvent, such as cyclohexane, methylcyclohexane, hexane, pure or in the form of a fraction of aliphatic and alicyclic solvents with a boiling point ranging from 65° C. to 72° C., n-heptane or a mixture of these solvents. Preferably, methylcyclohexane is used as inert hydrocarbon-based solvent.

This solubilizing of the salt of rare-earth element(s) may be carried out in batch mode or continuous mode, outside the line (L) or in the line (L). According to an implementation variant, the solution of the salt of rare-earth element(s) may be diluted in the line (L).

According to another preferred embodiment, as described, for example, in patent document WO-A-00/64 910, the salt of rare-earth element(s) reacted is synthesized "in situ" directly in the solvent, i.e. the reaction of the phosphoric acid derivative with the rare-earth metal(s) compound is carried out in the presence of said solvent so as to form the salt of rare-earth element(s) in said solvent, said salt being in the form of a more or less viscous solution which contains the compound having the formula $Nd(P)_3 \cdot x$ PH, in which x is a number, which may or may not be an integer, equal to or greater than 0, and PH represents a free acid which is a diester of phosphoric acid having the formula $[(RO)_2(HO)P=O]$ resulting from the "in situ" synthesis.

According to these two embodiments of the salt of rare-earth element(s), the concentration of the salt of rare-earth element(s) in the viscous solution obtained may be very high, of the order of 0.1 to 0.15 mol/l, i.e. greater than that used in the catalytic system used in the process in accordance with the invention, which can range from 0.002 mol/l to 0.08 mol/l. The concentration of salt of rare-earth element(s) is adjusted as known per se by dilution of the viscous solution in an appropriate additional volume of solvent(s) at various levels of the line (L), namely, in particular, in a storage reservoir for the viscous solution of the salt of rare-earth element(s) or before or after an injection pump for injecting the solution of the salt of rare-earth element(s) located at the head of the line (L) upstream of the alkylation reactor, or at another point of the line (L) located upstream of the alkylation reactor.

According to another embodiment, the solution of rare-earth element(s) prepared according to the first embodiment may contain free acid having the formula $(RO)_2(HO)P=O$, which is added during or after the solubilization of the salt in powder form.

By way of salts of said rare-earth metal(s) that can be used in the process in accordance with the invention, mention may be made of organophosphates of neodymium, of cerium or of didymium, and preferably neodymium tris[dibutyl phosphate], neodymium tris[dipentyl phosphate], neodymium tris[dioctyl phosphate], neodymium tris[bis(2-ethylhexyl) phosphate], neodymium tris[bis(1-methylheptyl) phosphate], neodymium tris[bis(p-nonylphenyl) phosphate], neodymium tris[butyl(2-ethylhexyl) phosphate], neodymium tris[(1-methylheptyl)(2-ethylhexyl) phosphate], neodymium tris[(2-ethylhexyl)(p-nonylphenyl) phosphate] or neodymium tris[bis(2-ethylhexyl) phosphate]. A mixture of several organic phosphoric acid salts of rare-earth metal(s) may also be used as salt.

According to a preferred example common to these embodiments, a tris[bis(2-ethylhexyl) phosphate] of said rare-earth metal(s) is used as salt. Even more preferably, said salt of rare-earth element(s) is neodymium tris[bis(2-ethylhexyl) phosphate] (hereinafter abbreviated to $Nd(P)_3$).

In the process in accordance with an embodiment of the invention, when the salt of rare-earth element(s) is in the form of a non-hygroscopic powder, the reaction for solubilizing the salt of rare-earth element(s) is carried out in a reactor, in continuous mode or in batch mode, at a temperature ranging from 10° C. to 100° C., advantageously from 20° C. to 60° C. and preferably approximately equal to 30° C., and for a period ranging from 15 minutes to 60 minutes and preferably approximately equal to 30 minutes, by introduction into the reactor of the salt and then of said solvent(s).

By way of alkylaluminium corresponding to the formula $AlR_3$ or $HAlR_2$ that can be used to constitute said alkylating agent in step (i) of the process according to an embodiment of the invention, mention may be made of alkylaluminiums such as:

trialkylaluminiums, for example trimethylaluminium, triethylaluminium, tri-n-propylaluminium, triisopropylaluminium, tri-n-butylaluminium, tri-t-butylaluminium, triisobutylaluminium, tri-n-pentylaluminium, tri-n-hexylaluminium, tri-n-octylaluminium, tricyclohexylaluminium, or dialkylaluminium hydrides, for example diethylaluminium hydride, diisopropylaluminium hydride, di-n-propylaluminium hydride, diisobutylaluminium hydride, di-n-octylaluminium hydride, di-n-butylaluminium hydride.

It will be noted that this alkylating agent is preferably composed of diisobutylaluminium hydride (hereinafter abbreviated to "DiBAH").

It will also be noted that the (alkylating agent/salt of rare-earth element(s)) molar ratio that can be used in the synthesis process according to the invention may equally have a value of less than or equal to 5, like the abovementioned document WO-A-02/38636, for example with the aim of obtaining diene elastomers having reproducible and high levels of cis-1,4 linkages, or else a value greater than 5, like the abovementioned document WO-A-03/097708. According to one embodiment, the alkylating agent/salt molar ratio ranges from 1.3 to 15 and is preferably equal to 2.

By way of alkylaluminium halide that can be used as halogen donor in step (ii) of the process according to the invention, use is preferably made of an alkylaluminium monohalide such as diethylaluminium chloride, n-propylaluminium chloride, diisopropylaluminium chloride, di-n-butylaluminium chloride, diisobutylaluminium chloride, di-n-octylaluminium chloride or diphenylaluminium chloride. It will be noted that this alkylaluminium halide is preferably diethylaluminium chloride (hereinafter abbreviated to "DEAC").

The (halogen/salt of rare-earth element(s)) molar ratio may have a value ranging from 2 to 3.5 and preferably ranging from 2.5 to 3.

According to a particularly advantageous embodiment of the invention, a combination of diisobutylaluminium hydride and diethylaluminium chloride, as alkylating agent and halogen donor, respectively, is used.

It will be noted that alkylaluminium sesquihalides, such as ethylaluminium sesquichlorides, cannot be used in the catalytic systems according to the invention due to the fact that they do not make it possible to obtain diene elastomers, such as polybutadienes, that have both a polydispersity index of less than 2.1 and a Mooney viscosity ML(1+4) at 100° C. greater than or equal to 40.

The salt of rare-earth element(s) in solution, the preforming conjugated diene monomer and the alkylating agent are simultaneously introduced preferably directly in their entirety into the alkylation reactor. However, according to one embodiment of the invention, only a part of said preforming monomer may be introduced directly into the alkylation reactor, the other part being introduced into the line (L) upstream, either into the solubilization reactor, or into the storage reservoir for the solution of said conjugated diene of rare-earth element(s), or into a dynamic mixer of perfectly agitated type.

According to one embodiment of the process according to the invention, prior to the alkylation step (i), a part of said solution of salt of one or more rare-earth metal(s) is brought into contact, in continuous mode or in batch mode and with stirring in said line (L), with a part of the preforming conjugated diene at a controlled temperature ranging from 10° C. to 60° C. In the case of bringing into contact in batch mode, the contact time is from 15 minutes to 60 minutes, and preferably approximately equal to 30 minutes.

According to an advantageous embodiment, the bringing into contact, in continuous mode, in the feed line (L) of a polymerization reactor, of the organic phosphoric acid salt of one or more rare-earth metal(s) in solution with said preforming conjugated diene is carried out at a controlled temperature approximately equal to 30° C.

According to a first variant of embodiment of the process according to the invention, prior to the abovementioned alkylation step (i), the abovementioned bringing into contact, in batch mode or in continuous mode, of a part of the organic phosphoric acid salt of one or more rare-earth metal(s) in solution with a part of said preforming conjugated diene is carried out at the inlet of said line (L) in a reactor for solubilizing the salt of rare-earth element(s) in the solvent.

According to a second variant of embodiment of the process according to the invention, prior to the abovementioned alkylation step (i), a part of the preforming conjugated diene is continuously added into the feed line only in a well-mixed dynamic mixer, which is preferably jacketed, placed upstream of the alkylation reactor.

According to a third variant of embodiment, a part of said preforming diene can be injected into the line (L) in part both in the reactor for solubilizing the salt of rare-earth element(s) and in said well-mixed dynamic mixer.

According to another embodiment of the invention, prior to step (i), all the salt of rare-earth element(s) is solubilized with said solvent(s) in a solubilization reactor, and then said solution of the salt of rare-earth element(s) is brought into contact with all or part of the preforming conjugated diene, in the solubilization reactor, or the solution of the salt of rare-earth element(s) evacuated from the reactor is subsequently brought into contact with all or part of the preforming conjugated diene, in the line (L). This bringing into contact in the line (L) can be carried out in a well-mixed dynamic mixer.

Advantageously, the abovementioned step (i) comprises continuously bringing into contact, with mixing in an "alkylation" reactor composed of one or more, (n), dynamic mixer(s) of perfectly stirred type, placed in series on said line (L), the product of reaction of said preforming conjugated diene and said solution of the salt of rare-earth element(s) with said alkylating agent, in order for the alkylation reaction of said salt to be carried out, at a controlled temperature ranging from 25° C. to 80° C. and preferably approximately equal to 30° C., and for a characteristic minimum period of at least 5 min, and which advantageously ranges from 10 min to 60 min, and is preferably approximately equal to 15 minutes.

Said alkylating agent is injected directly, in its entirety, into the alkylation reactor placed on the line. However, according to one variant of embodiment, a part of said alkylating agent may be injected into the line (L) just before the alkylation reactor. The characteristic residence time of said alkylating agent in the alkylation reactor can be controlled and is controlled before the addition of the halogen donor. It will be noted that a characteristic minimum period of 5 minutes for this alkylation step is necessary for the synthesis of a catalytic system capable of producing a polymer or copolymer having the abovementioned advantageous characteristics.

Advantageously, said process according to an embodiment of the invention comprises, during the abovementioned step (ii), continuously bringing into contact, with mixing in a halogenation-ageing reactor placed on said line (L), the product of said alkylation reaction with said halogen donor, at a controlled temperature ranging from 40° C. to 80° C. and preferably approximately equal to 60° C., for a period preferably ranging from 10 minutes to 2 hours, and preferably approximately equal to 60 minutes, in order to carry out the halogenation and the ageing of the preformed catalytic system thus obtained.

Said halogen donor agent is preferably injected directly, in its entirety, into the halogenation-ageing reactor or into the first element of the halogenation-ageing reactor when the latter comprises several elements placed in series. According to one variant of embodiment, said halogen donor agent may be injected in its entirety or in part into the line (L) just before the halogenation-ageing reactor.

The continuous synthesis process according to embodiments of the invention makes it possible, without distinction, to store said preformed catalytic system downstream of said line at a relatively low temperature, within a range of values of from −25° C. to 20° C., preferably of from −15° C. to +10° C., or to send it directly into the polymerization reactor for polymerizing at least one conjugated diene monomer.

By way of diene elastomer that can be prepared by means of said catalytic system synthesized continuously by said process according to an embodiment of the invention, mention may be made of any homopolymer or copolymer obtained by homopolymerization or copolymerization of at least one conjugated diene monomer having from 4 to 12 carbon atoms.

Suitable conjugated diene monomer(s) include, in particular, 1,3-butadiene, isoprene, 2,3-di(C1 to C5 alkyl)-1,3-butadienes such as, for example, 2,3-dimethyl-1,3-butadiene, 2,3-diethyl-1,3-butadiene or 2-methyl-3-ethyl-1,3-butadiene, or a mixture of these monomers, and preferably 1,3-butadiene and isoprene.

The elastomers may, for example, be nonlinear block, random, linear block or microblock polymers, and be prepared in a dispersion or in solution or in a concentrated medium. The elastomers obtained according to this process are stereospecific and have a cis-1,4 linkage content of greater than or equal to 97%. These elastomers have a polymolecularity index Ip which is less than 3.2, and more advantageously less than or equal to 2.4.

Particularly preferably, said diene elastomer is chosen from the group of highly unsaturated diene elastomers composed of polybutadienes (BR) and synthetic polyisoprenes (IR) and random or block copolymers of butadiene and of isoprene (BIR).

According to one embodiment of the invention, an installation for implementing the abovementioned process for the continuous synthesis of said catalytic system comprises essentially:

(i) a continuous alkylation reaction which is composed of one or more, n, with n being an integer greater than 0, continuous alkylation, well-mixed dynamic mixer(s) and in which the alkylation reaction is carried out for a characteristic minimum period of five minutes;

(ii) a continuous halogenation-ageing reactor which comprises one or more, (n'), with n' being an integer greater than 0, well-mixed dynamic mixer(s) placed in series, and optionally one or more, (n"), with n" being an integer greater than or equal to 0, continuous plug-flow tubular reactor(s), which may or may not have static- or dynamic-type mixing, connected to the output of the line (L), it being possible for said dynamic mixer(s) and tubular reactor(s) to be placed in any order.

The continuous alkylation reactor used in the installation should not comprise a tubular reactor, but should be composed only of one or more, (n), well-mixed dynamic mixer(s). This is because, in an industrial use of the abovementioned synthesis process the presence of a plug-flow tubular reactor, even having static- or dynamic-type stirring, results in the formation of an uncontrollable "gel" which, after a few hours, clogs the alkylation reactor and the line (L) and leads to the installation being interrupted.

The continuous halogenation-ageing reactor may be composed of one or more, (n'), well-mixed dynamic mixer(s), of one or more, (n'), well-mixed dynamic mixer(s) and one or more, (n"), plug-flow tubular reactor(s), or of one or more, (n"), plug-flow tubular reactor(s) which may or may not have static- or dynamic-type mixing.

According to another embodiment of the invention, the above-mentioned installation also comprises:
- a reactor for solubilizing the salt of rare-earth metal(s);
- a well-mixed dynamic mixer for addition of the preforming conjugated diene in the feed line (L).

According to another embodiment of the invention, an installation for implementing the process for the continuous synthesis of said catalytic system comprises essentially:
(i) a storage reservoir which may or may not have a device for mixing the viscous solution of the salt of rare-earth element(s) prepared "in situ" directly in the solvent, in which it is possible, by means of an appropriate additional amount of solvent, to carry out a dilution of said salt of rare-earth element(s) in order to obtain a solution of the salt of rare-earth element(s) having the salt concentration desired for the implementation of the process according to the invention;
(ii) a continuous alkylation reactor which is provided:
with a first inlet which is connected to the storage reservoir for the viscous solution of the salt of rare-earth element (s) prepared "in situ", or to a feed pump which is suitable for bringing the solution of the rare-earth element(s) and of the preforming conjugated diene into said alkylation reactor,
with a second inlet which is connected to a reservoir containing an alkylating agent of alkylaluminium type having the formula $AlR_3$ or $HAlR_2$ and which is suitable for bringing said alkylating agent into said alkylation reactor,
with an outlet suitable for evacuating the alkylation product from said alkylation reactor to a continuous halogenation-ageing reactor,
(iii) a continuous halogenation-ageing reactor which is provided:
with a first inlet which is connected to said outlet of the alkylation reactor and which is suitable for bringing the product of the alkylation reaction into said halogenation-ageing reactor,
with a second inlet which is connected to a reservoir containing a halogen donor of alkylaluminium halide type and which is suitable for introducing said halogen donor into said halogenation reactor,
with an outlet of the halogenation reactor connected to the downstream part of the line (L) of the installation.

The continuous alkylation reactor may be realized in various embodiments, for example may be composed of one or more, (n), preferably n from 1 to 5, well-mixed dynamic mixer(s), placed in series, but with the exclusion of a tubular reactor irrespective of whether or not it is provided with static- or dynamic-type mixing.

The alkylation reactor is connected to one or more feed source(s) for solvent(s), preforming monomer, salt of rare-earth element(s) in solution, alkylating agent.

The continuous halogenation-ageing reactor in which the preformed catalyst is obtained at the end of the halogenation may be realized in various embodiments, for example may be composed of a well-mixed dynamic mixer or of several, (n'), preferably from 1 to 5, well-mixed dynamic mixers, placed in series, of identical or different sizes and volumes, or of (n') well-mixed dynamic mixers and of one or more, (n"), preferably from 1 to 3, continuous plug-flow tubular reactor(s) having static- or dynamic-mixing, it being possible for said mixer(s) and tubular reactor(s) placed in series to be placed in a different order.

By way of alkylation and/or halogenation-ageing reactors, use is preferably made of one or more jacketed, well-mixed dynamic mixer(s) placed in series, optionally with cooling bundles or internal coils, for suitably controlling the temperature.

According to another embodiment of the invention for the continuous preparation of the catalytic system, the above-mentioned installation also comprises:
a reactor for solubilizing the salt of rare-earth metal(s), which can operate in continuous mode or batch mode, for example of well-mixed jacketed type, which is equipped:
with a first inlet suitable for introducing into this reactor, via a pump, or via a difference in pressure, at least one saturated and aliphatic or alicyclic, and inert hydrocarbon-based solvent stored in a reservoir;
with a second inlet suitable for introducing into this reactor, via a powder metering device, an organic phosphoric acid salt of rare-earth element(s) (advantageously the salt of abbreviated formula $Nd(P)_3$ mentioned above);
with a third inlet suitable for optionally introducing into this reactor a part of the preforming conjugated diene;
with an outlet suitable for evacuating a solution of said salt in said solvent(s), which may or may not contain the preforming conjugated diene, from said reactor to the downstream part of the line of the installation (L);
a well-mixed dynamic mixer for continuous addition of the preforming conjugated diene, which is provided:
with a first inlet which is connected to said outlet of the solubilization reactor, respectively outlet of the storage reservoir for the solution of the salt of rare-earth element(s), and which is suitable for introducing said solution into said mixer;
with a second inlet which is connected to a reservoir containing a preforming conjugated diene and which is suitable for introducing said conjugated diene into said mixer; and
with an outlet suitable for evacuating from said mixer a mixture of said solution and of said preforming conjugated diene.

When said salt of rare-earth metal(s) is prepared "in situ" directly in the solvent, it is preferably introduced directly into the alkylation reactor; however, it may also be introduced in its entirety or in part into the well-mixed dynamic mixer for addition of the preforming diene, either simultaneously with the preforming conjugated diene, or before the latter or alternatively after or before the pump (18).

The preforming conjugated diene monomer, and optionally the inert hydrocarbon-based diluting solvent, can be introduced into the line where the salt of rare-earth element(s) in solution is circulating.

Advantageously, the installation according to the invention also comprises, downstream of said line, at least one continuous polymerization reactor which is suitable for polymerizing at least one conjugated diene monomer while being continuously fed by said line.

It will be noted that the installation according to an embodiment of the invention advantageously makes it possible to couple the continuous synthesis of said catalytic system to a polymerization of at least one conjugated diene, also carried out continuously in a polymerization reactor placed at the end of the line (L) and to a process for the continuous polymerization of at least one conjugated diene using the catalytic system obtained according to the invention.

The installation according to the invention may optionally also comprise a storage reservoir for the catalytic system.

BRIEF DESCRIPTION OF DRAWINGS

The abovementioned characteristics of embodiments of the invention, and also others, will be understood more clearly on reading the following description of several exemplary embodiments of the invention, given by way of nonlimiting illustration in relation to the attached drawings, among which.

DETAILED DESCRIPTION OF SPECIFIC EMBODIMENTS

Figure 1:
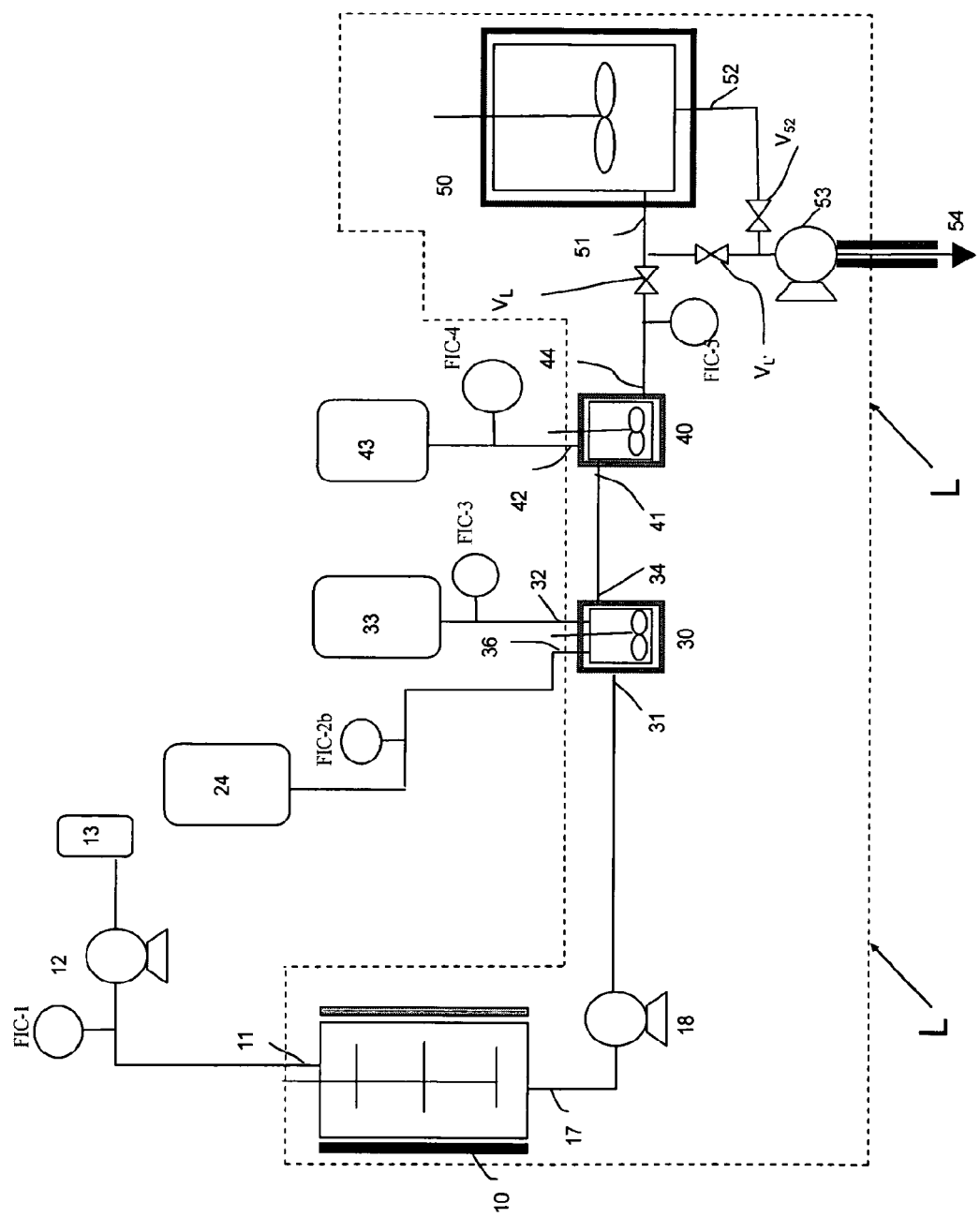
FIG. 1 is a scheme of an installation according to an exemplary embodiment of the invention for the continuous preparation of a catalytic system according to the invention.

The installation illustrated in FIG. 1 comprises essentially a storage reservoir (10) for a solution of the salt of rare-earth element(s) prepared "in situ" in the solvent, equipped:
  with an inlet connected to a reservoir (13) of saturated and aliphatic or alicyclic, and inert hydrocarbon-based solvent(s), which is (are) used to control the concentration of the salt of rare-earth element(s) to a suitable value, via a pump (12) or via a difference in pressure;
  with an outlet (17) suitable for bringing a solution of said salt of rare-earth element(s) in said solvent(s) into an alkylation reactor (30), or connected to a pump (18) suitable for directly or indirectly injecting a concentrated or dilute solution of said salt of rare-earth element(s) and for diluting therein, at the outlet, the concentrated solution;

an alkylation reactor composed of a well-mixed dynamic mixer (30), which is for example jacketed, and which is equipped:
  with a first inlet (31) which is connected to the outlet of the pump (18) suitable for bringing said solution of the salt of rare-earth element(s) into this mixer (30);
  with a second inlet (32) which is connected to a reservoir (33) containing an alkylating agent of alkylaluminium type and which is suitable for introducing said alkylating agent into this mixer (30);
  with a third inlet (36) which is connected to a reservoir (24) containing the preforming conjugated diene, which is suitable for introducing said preforming conjugated diene into this mixer (30);
  with an outlet (34) suitable for bringing the product of the mixing of said mixture and of said alkylating agent, from this mixer (30) to the halogenation-ageing reactor (40);

a halogenation-ageing reactor (40) composed of a well-mixed dynamic mixer, which is for example jacketed, and which is equipped:
  with a first inlet (41) which is connected to the alkylation outlet (34) and which is suitable for bringing the product of the alkylation reaction into this mixer (40);
  with a second inlet (42) which is connected to a reservoir (43) containing a halogen donor of alkylaluminium halide type and which is suitable for bringing said halogen donor into said mixer (40);
  with an outlet (44) which is suitable for evacuating the catalytic system continuously prepared according to the invention from the mixer (40) and bringing it continuously, via a pump (53), to a polymerization reactor for polymerizing at least one conjugated diene monomer.

According to an optional embodiment, the installation also comprises a tubular reactor (45), which is for example jacketed, which is connected to the outlet (44) and which is suitable for controlling or varying the residence time of said mixture in said reactor.

According to an additional optional embodiment, the catalytic system continuously prepared is brought to a storage reservoir (50), suitable for conserving the catalytic system at a temperature ranging from −25° C. to +20° C. for a period of time that may reach several weeks, equipped:
  with a storage inlet (51) connected to the outlet (44) of the mixer (40) or to the outlet of the optional tubular reactor (45), and
  with an outlet (52) intended to continuously feed said polymerization reactor (not illustrated), placed at the end of the line (L) and connected to the latter via said pump (53) (see arrow 54), from the outlet (52).

To this effect, valves (VL), (VL') and (V52) are respectively provided for on the line (L) and the outlet (52).

The installation illustrated in FIG. 1 may, according to one embodiment of the invention, not comprise a storage reservoir (10) for the solution of the salt of rare-earth element(s), the solution of the salt of rare-earth element(s) being introduced directly into the pump (18) either in concentrated form, with the dilution being carried out at the outlet of said pump (18) or at the beginning of the line (L) before the alkylation reactor (30), or in dilute form at the chosen concentration for reacting with the other constituents.

Figure 2:
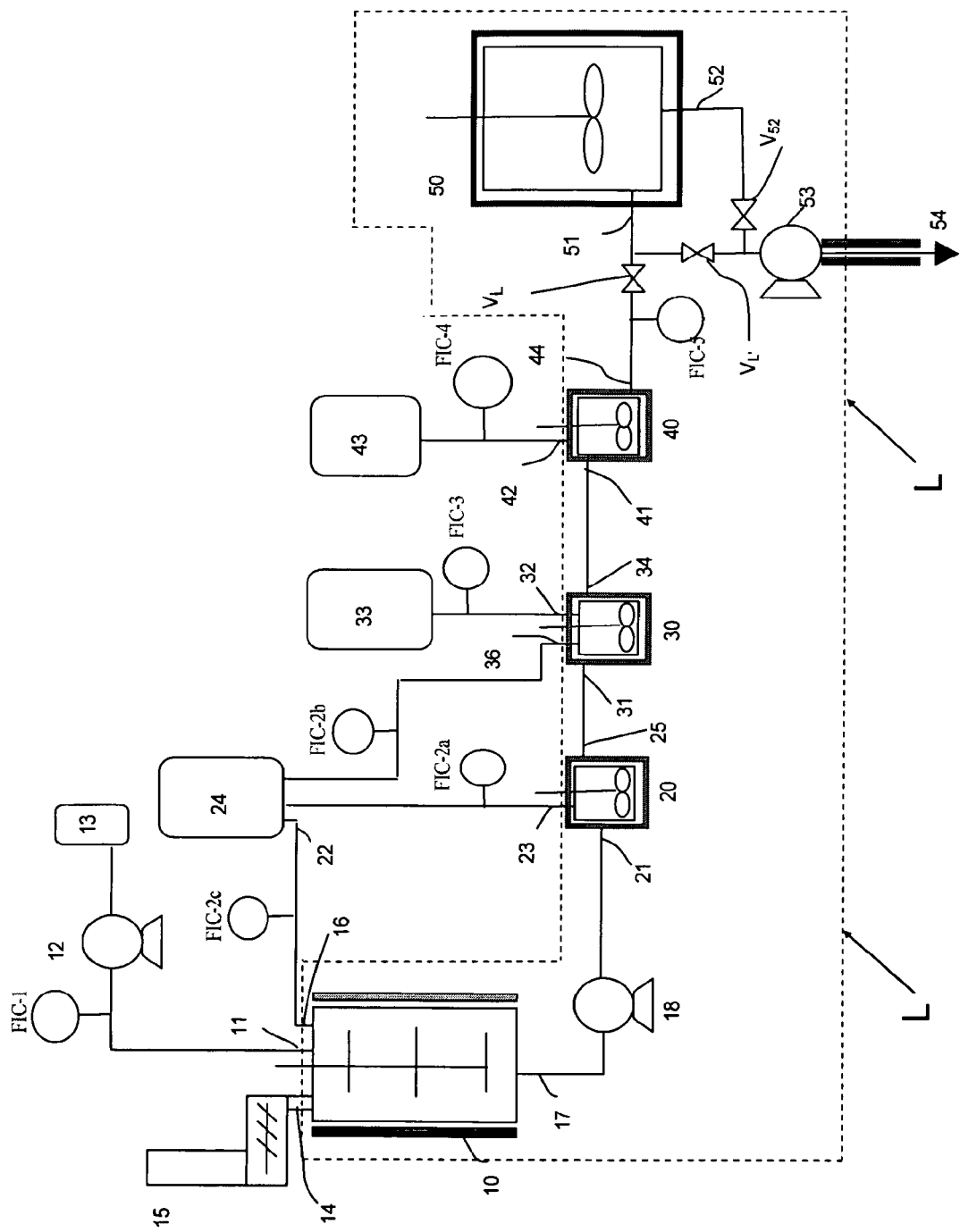
FIG. 2 is a scheme of an installation according to a variant of embodiment of the invention for the continuous preparation of a catalytic system according to the invention.

The installation illustrated in FIG. 2 is identical to that represented in FIG. 1, except for the fact that it also comprises:

a solubilization reactor (10) in place of the storage reactor (10), for example of well-mixed, jacketed type, equipped:

with a first inlet (11) suitable for introducing into this reactor (10), via a pump (12) or via a difference in pressure, at least one saturated and aliphatic or alicyclic, and inert hydrocarbon-based solvent stored in a reservoir (13);

with a second inlet (14) suitable for introducing into this reactor (10), via a powder metering device (15), an organic phosphoric acid salt of rare-earth element(s), advantageously the salt of formula abbreviated to $Nd(P)_3$ mentioned above;

with a third inlet (16) suitable for optionally introducing into this reactor (10) a part of the preforming conjugated diene stored in the reservoir (24) which is equipped with an outlet (22) connected to the inlet (16); and with an outlet (17) suitable for evacuating from said reactor (10) a solution of said salt in said solvent(s) which may or may not contain preforming conjugated diene;

a well-mixed dynamic mixer for addition of the preforming diene (20), which is for example jacketed, and which is equipped:

with a first inlet (21) which is connected, via a pump (18), to a solubilization reactor (10) containing the salt of rare-earth element(s) in solution and, optionally, a preforming conjugated diene, and which is suitable for bringing said solution into this mixer (20);

with a second inlet (23) which is connected to a reservoir (24) containing a preforming conjugated diene and which is suitable for introducing said conjugated diene into this mixer (20); and with an outlet (25) suitable for bringing the mixture of said solution and of said conjugated diene to the alkylation reactor (30).

According to one embodiment of the invention, the well-stirred dynamic mixer (20) has, for example, a volume of 25 ml and it is fitted with a stirrer suitable for rotating at a speed, for example, equal to 1500 rpm.

Figure 3:
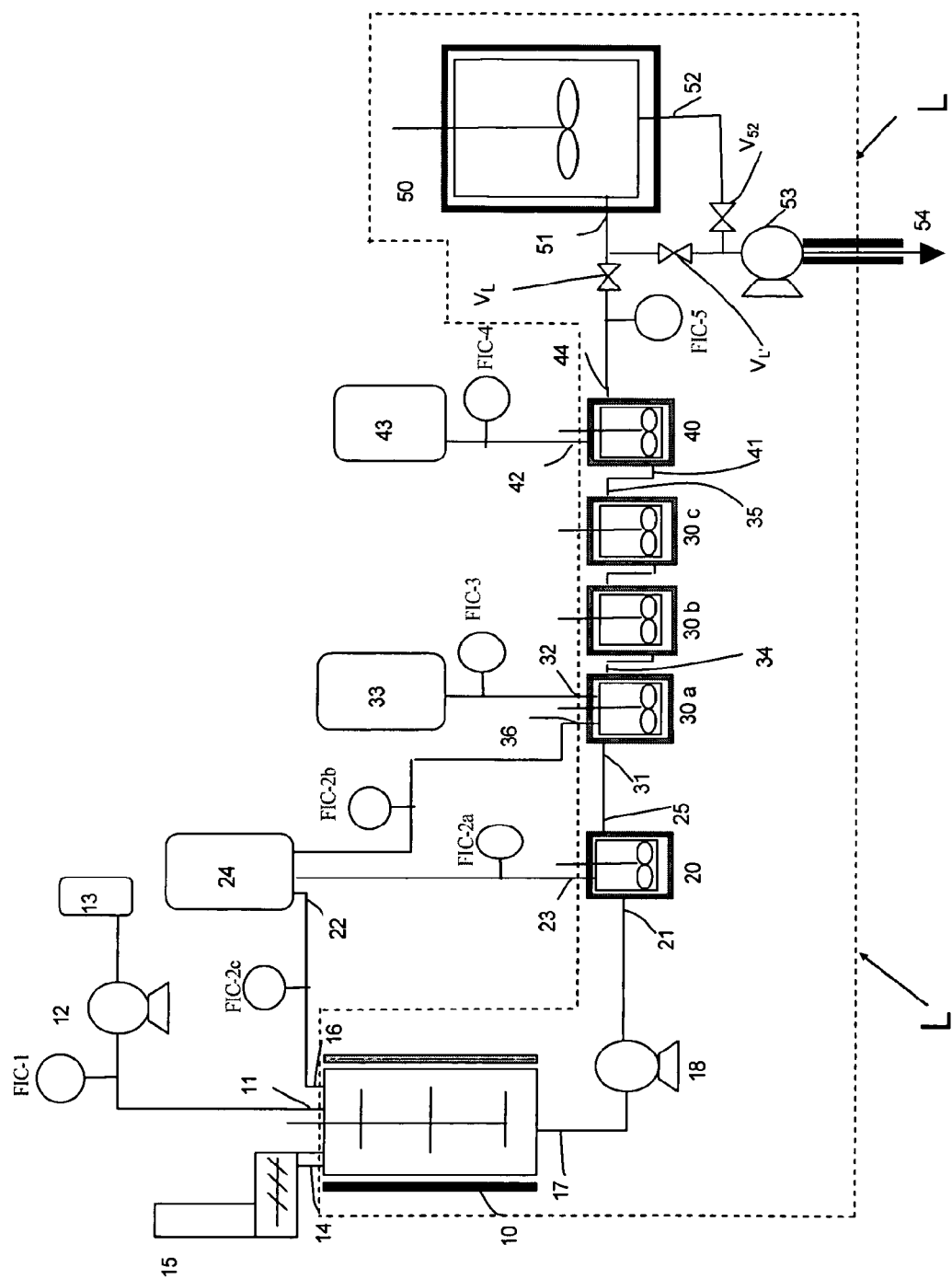
FIG. 3 is a scheme of an installation according to an additional variant of embodiment of the invention for the continuous preparation of a catalytic system according to the invention.

The installation represented in FIG. 3 is identical to that illustrated in FIG. 2, except for the fact that the alkylation reactor (30) is composed of n (n=3) jacketed, well-mixed dynamic alkylation mixers (30a), (30b), (30c), capable of operating continuously and placed in series, provided:

for the first mixer (30a):

with a first inlet (31) which is connected to the outlet (25) of the mixer for addition of the preforming conjugated diene;

with a second inlet (32) which is connected to a reservoir (33) containing an alkylating agent of alkylaluminium type and which is suitable for bringing said alkylating agent into this mixer (30a);

with a third inlet (36) which is connected to a reservoir (24) containing the preforming conjugated diene, which is suitable for introducing said preforming conjugated diene into this mixer (30);

with an outlet (34) which is connected to the inlet of the second mixer (30b), which second mixer is connected to the third mixer (30c), the outlet (35) of which is connected to the halogenation-ageing reactor.

Figure 4:
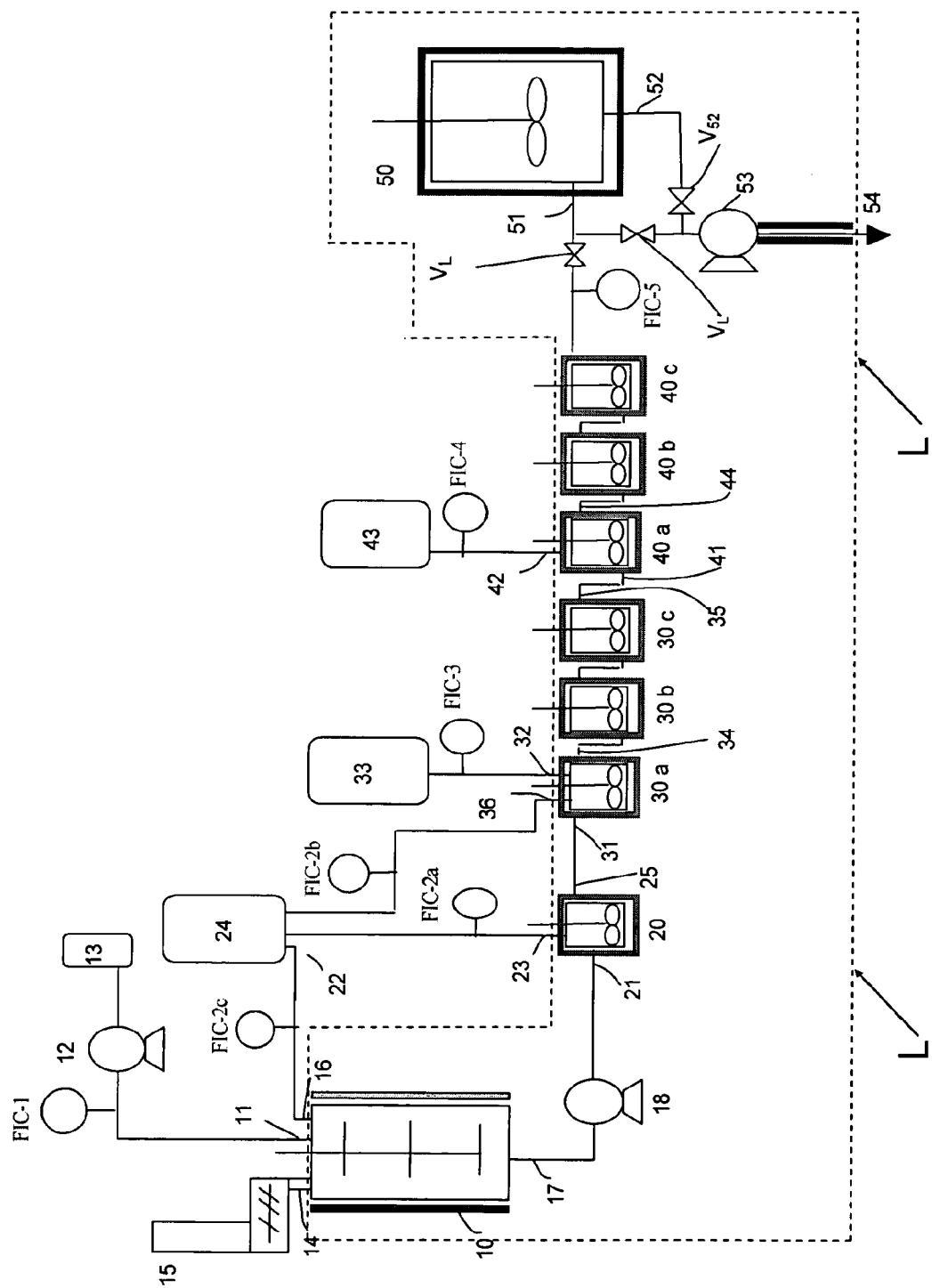
FIG. 4 is a scheme of an installation according to a third variant of embodiment of the invention for the continuous preparation of a catalytic system according to the invention.

The installation represented in FIG. 4 is identical to that represented in FIG. 3, other than the fact that the halogenation-ageing reactor (40) is composed of n' (n'=3) jacketed, well-mixed dynamic mixers, respectively (40a), (40b), (40c), provided, for the first mixer:

with an inlet (41) which is connected to the outlet (35) of the alkylation reactor;

with a second inlet (42) which is connected to a reservoir (43) containing a halogen donor of alkylaluminium halide type and which is suitable for bringing said halogen donor into this mixer (40a);

with an outlet (44) which is connected to a second mixer (40b), which second mixer is connected to a third mixer (40c) connected, at the outlet of the line (L), either directly to the polymerization reactor for polymerizing at least one conjugated diene monomer, or to the storage reservoir (50).

Figure 5:
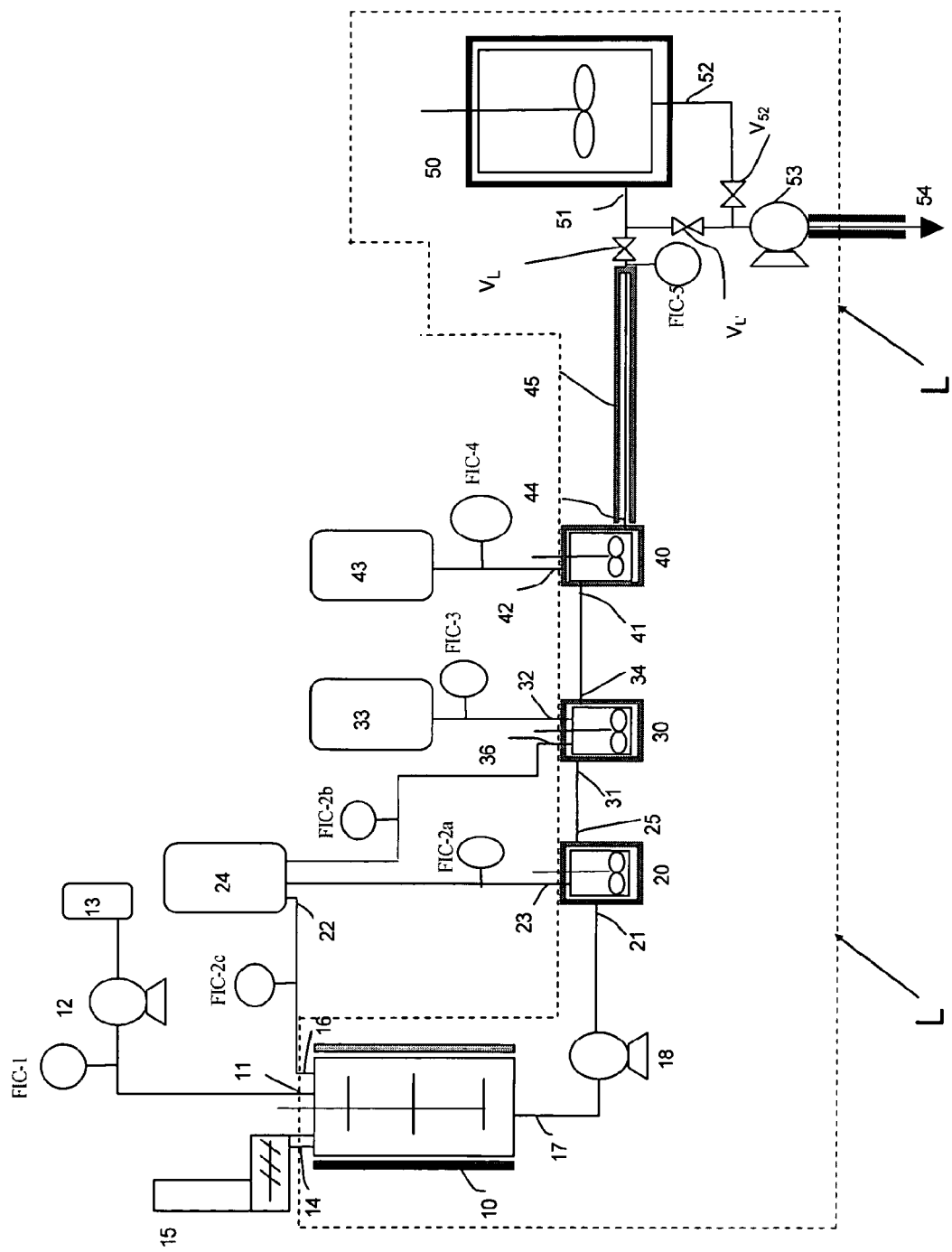
FIG. 5 is a scheme of an installation according to a fourth variant of embodiment of the invention for the continuous preparation of a catalytic system according to the invention.

The installation represented in FIG. 5 is identical to that illustrated in FIG. 2, except for the fact that the halogenation-ageing reactor (40) also comprises a plug-flow tubular reactor (45) of dynamic mixing type which is suitable for controlling or varying the ageing time of the preformed catalyst prepared continuously according to the invention.

Figure 6:
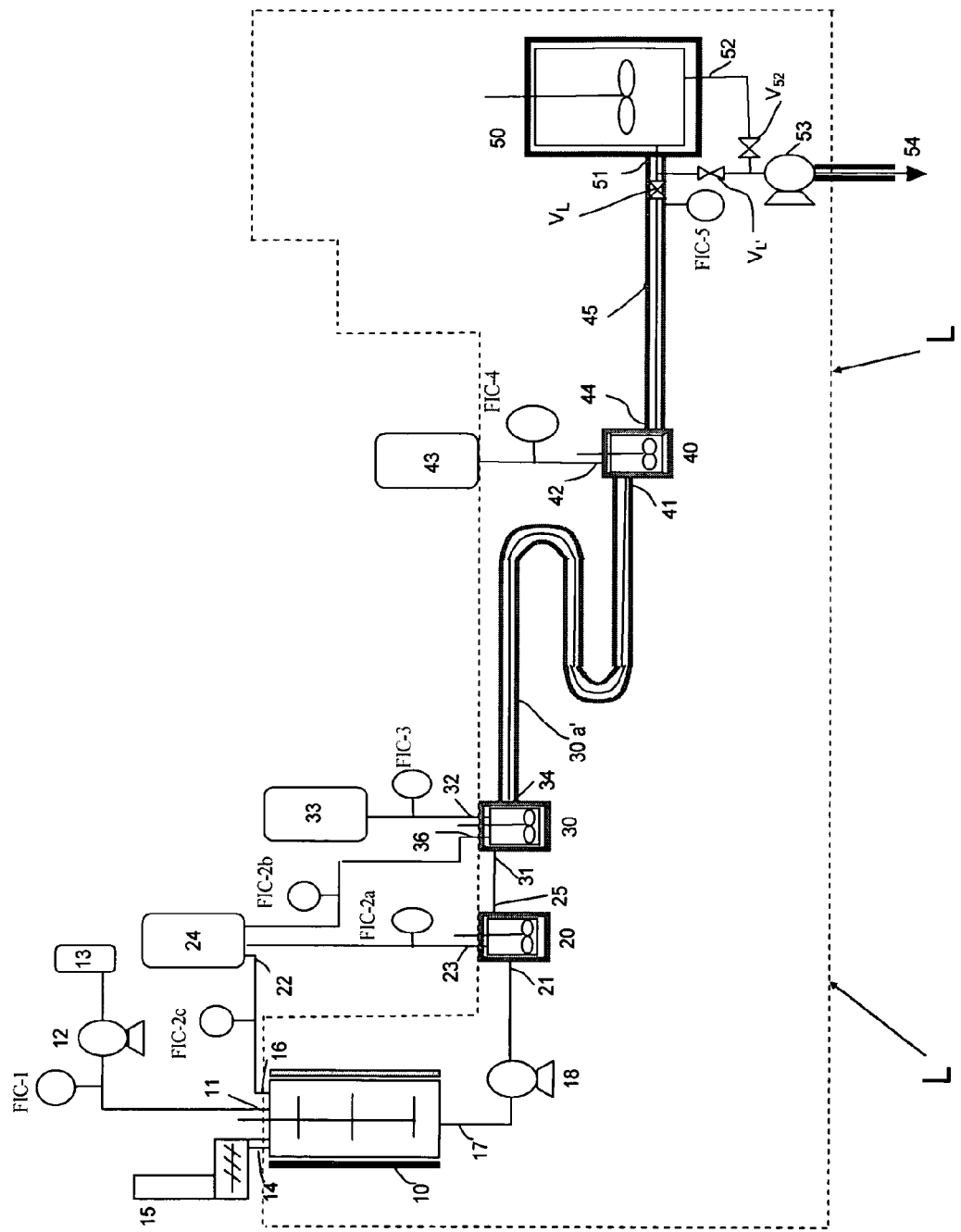
FIG. 6 is a scheme of an installation according to a variant of embodiment not in accordance with the invention for the continuous preparation of a catalytic system according to the invention and the continuous polymerization of at least one conjugated diene monomer.

The installation represented in FIG. 6 is identical to that illustrated in FIG. 5, except for the fact that the alkylation reactor comprises, in addition to the well-mixed dynamic mixer (30), a plug-flow tubular reactor (30a') of dynamic mixing type.

Also represented are a plurality of flow meters FIC-1, FIC-2a, FIC-2b, FIC-2c, FIC-3, FIC-4, which are respectively provided for upstream of the reactor 10 and of the mixers 20, 30 and 40.

In operating mode, the flow rate of the solution of the salt of rare-earth element(s) leaving the solubilization reactor (10) is set by controlling the final flow rate of the catalytic system at the outlet of the line L by means of a flow meter FIC-5. For each catalytic system of formula intended, the flow rates of the various elements of the catalytic formula are measured and adjusted in order to synthesize a catalyst of given catalytic formula.

Those skilled in the art will be able to adjust the volume and the size of each of the elements constituting the alkylation (30) and halogenation (40) reactors according to the various elements of the catalytic formula intended, so as to vary the characteristic residence time of the alkylation reaction and/or the ageing time of the preformed catalytic system obtained at the end of the halogenation reaction.

The abovementioned characteristics of the present invention will be understood more clearly on reading the description of several exemplary embodiments of the invention.

Example I

Preparation of a Catalytic System T1 According to a Continuous Tubular-Reactor Process not in Accordance with the Invention and of a Catalytic System MD1 According to a Process in Accordance with the Invention Using Well-mixed Dynamic Mixers:

1) Catalytic system T1: This catalytic system was prepared according to a process carried out in the installation represented in FIG. 6. The solubilization reactor (10) is a tank mixed by means of 3 rotors evenly distributed through its height and having a volume of 32.5 l. The dynamic mixer (30) and the tubular alkylation reactor (30a') have volumes of 25 ml and 930 ml, respectively. The dynamic mixer (40) and the tubular halogenation-ageing reactor (45) have volumes of 150 ml and 3670 ml, respectively. The flow rate of the installation is 3.82 l/h.

The catalytic system T1 was continuously prepared, this system having the catalytic formula Nd/butadiene/DiBAH/DEAC=1/30/2/2.9 in terms of molar ratio and the concentration 0.02 mol.l$^{-1}$ with respect to neodymium.

More specifically, this catalytic system T1 was prepared by:
- solubilizing the salt NdP$_3$ in MCH and adding the preforming diene, in the reactor (10), for 30 min or more at 30° C.;
- alkylating the mixture thus obtained and maintained at 30° C., in the dynamic mixer (30) and the tubular reactor, via "DiBAH", for a period of 15 min, the concentration of DiBAH used being 1 mol.l$^{-1}$; then
- halogenating the product of the alkylation reaction, in the dynamic mixer (40), and ageing it, in the tubular reactor, via "DEAC", at 60° C. and for a period of 60 min. The concentration of "DEAC" used is 0.5 mol.l$^{-1}$.

The catalytic solution thus obtained is cooled by transferring into the mixed storage reservoir 50 maintained at −10° C.

2) Catalytic system MD1 according to the invention:

This catalytic system is prepared according to a process in accordance with the invention carried out in the installation described in FIG. 3. The solubilization reactor (10) is a tank mixed by means of 3 rotors equally distributed through its height and having a volume of 32.5 l. The well-mixed dynamic mixers (30a), (30b), (30c) intended for the alkylation step and (40) intended for the halogenation/ageing step have respective volumes of 0.16 l for (30a), (30b), (30c) and 2.75 l for (40). The flow rate of the installation is 1.93 l/h.

The catalytic system MD1 was prepared continuously, said system having the catalytic formula Nd/butadiene/DiBAH/DEAC=1/30/2/2.7 and the concentration 0.02 mol.l$^{-1}$ with respect to neodymium.

More specifically, this catalytic system was prepared by:
- in the reactor 10, solubilizing the salt NdP$_3$ in MCH and adding the preforming diene, for 30 min or more at 30° C.;
- in well-mixed dynamic mixers (30a), (30b) and (30c), alkylating the mixture thus obtained and maintained at 30° C., via "DiBAH", for a period of 15 min, the DiBAH concentration used being 1 mol.l$^{-1}$; then
- in the well-mixed dynamic mixer (40), halogenating and ageing of the product of the alkylation reaction, via "DEAC", at 60° C. and for a period of 85 min. The "DEAC" concentration used is 0.5 mol.l$^{-1}$.

The catalytic solution thus obtained is cooled by transfer into the mixed storage reservoir 50 maintained at −10° C.

It should be noted that a "DEAC" concentration of 1 mol.l$^{-1}$ could also be used for preparing these catalytic systems.

3) Comparison of the catalytic systems T1 and MD1:

For the process for preparing the catalytic system T1 carried out in the installation represented in FIG. 6, after 7 hours of stable operation, we observe in the dynamic mixer (40) dedicated to the injection of the "DEAC" and in the adjacent tubular ducts, a high proportion of gel which begins to greatly obstruct the assembly outlet and destabilize the operating of the process. It is, moreover, necessary to change the outlet filters very regularly. Thus, continuous operating is not strictly speaking possible since it is necessary to frequently stop the line in order to clean it.

For the process in accordance with the invention carried out in order to prepare the catalytic system MD1, we observe neither blocking of the line nor gel formation in the reactors and ducts of the line (L).

It should also be noted that a variant of the tubular process, consisting in using static mixers in place of the dynamic mixer (40) at the "DEAC" injection stage, is obviously not at all advantageous in the sense that the least mixing further promotes the formation of the gel mentioned above.

Example II

Preparation of a Catalytic System D1 According to a Batch Process and Comparison with the Catalytic System MD1 Prepared According to the Continuous Process in Accordance with the Invention:

1) Catalytic system Dl:

A catalytic system D1 was prepared by following the batch-mode preparation process described in the abovementioned document WO-A-02/38636.

This catalytic system D1 has the following formula: Nd/butadiene/DiBAH/DEAC=1/30/2/2.9 and its concentration is 0.02 mol.l$^{-1}$.

To this effect, a solvent composed of methylcyclohexane (MCH) was poured into a 25 l batch reactor previously cleaned to remove its impurities. Next, this salt was subjected to nitrogen sparging for 3 min, and then the following successive steps were carried out:

Solubilization step:

For the purpose of forming a gelatinous solution, the neodymium salt NdP$_3$ in powder form was introduced into the reactor containing the solvent; the duration and the temperature for bringing the solvent into contact with the salt after further sparging for 3 minutes are, respectively, 30 minutes at 30° C.

Preforming diene addition step:

Next, butadiene was introduced into this reactor at a temperature of 30° C.

Alkylation step:

"DiBAH" was then introduced, as an alkylating agent, into this reactor maintained at 30° C., in a concentration of approximately 1 mol.l$^{-1}$. The reaction medium immediately becomes fluid. The alkylation time is 15 min.

The temperature of the alkylation reaction was 30° C.

Halogenation step:

"DEAC" was then introduced into this reactor in a concentration of approximately 1 mol.l$^{-1}$. The temperature of the reaction medium was then brought to 60° C. The extremely rapid rise in temperature is related to the exotherm of the reaction, proportional to the amount of butadiene introduced into the catalyst, and to the absence of notable and simultaneous cooling by the walls of the reactor.

Ageing step:

Ageing of the mixture thus obtained was then carried out by maintaining this temperature of 60° C. for a period of 60 min.

Finally, the catalytic solution obtained was cooled and stored under a nitrogen atmosphere in a freezer at a temperature of −15° C.

2) Comparison of the catalytic systems D1 and MD1 in polymerization of butadiene:

A 250 ml "Steinie" bottle is used as polymerization reactor. Each polymerization reaction is carried out by subjecting this pre-washed and -dried bottle to stirring in a thermostatted waterbath.

Each butadiene polymerization reaction (10 g of butadiene are used per bottle) is carried out in MCH at 30° C. and under an inert nitrogen atmosphere. A "polymerization solvent (MCH)/monomer (Btd)" ratio by mass equal to 9 was used (this ratio by mass is hereinafter referred to as S/M).

The amount of catalytic base with respect to neodymium is 846 μmol per 100 g of butadiene.

The leaktightness of the bottle is ensured by an assembly of the "seal/pierced cap" type, thus allowing the addition of each catalytic system using a syringe.

Methanol is used, at a volume of 1 ml, as agent for stopping the polymerization reaction, and N-1,3-dimethylbutyl-N'-phenyl-p-phenylenediamine (6PPD) is used as protecting agent (at a volume of 1 ml at a concentration of 10 g.l$^{-1}$ in cyclohexane, i.e. a mass of 0.02 g).

The measurement of the degree of conversion of the butadiene to polybutadiene as a function of the reaction time is used to describe the polymerization kinetics.

The inherent viscosity ηinh at 0.1 g.dl$^{-1}$ in toluene characterizes, for its part, the macrostructure of each polybutadiene obtained.

Figure 7:
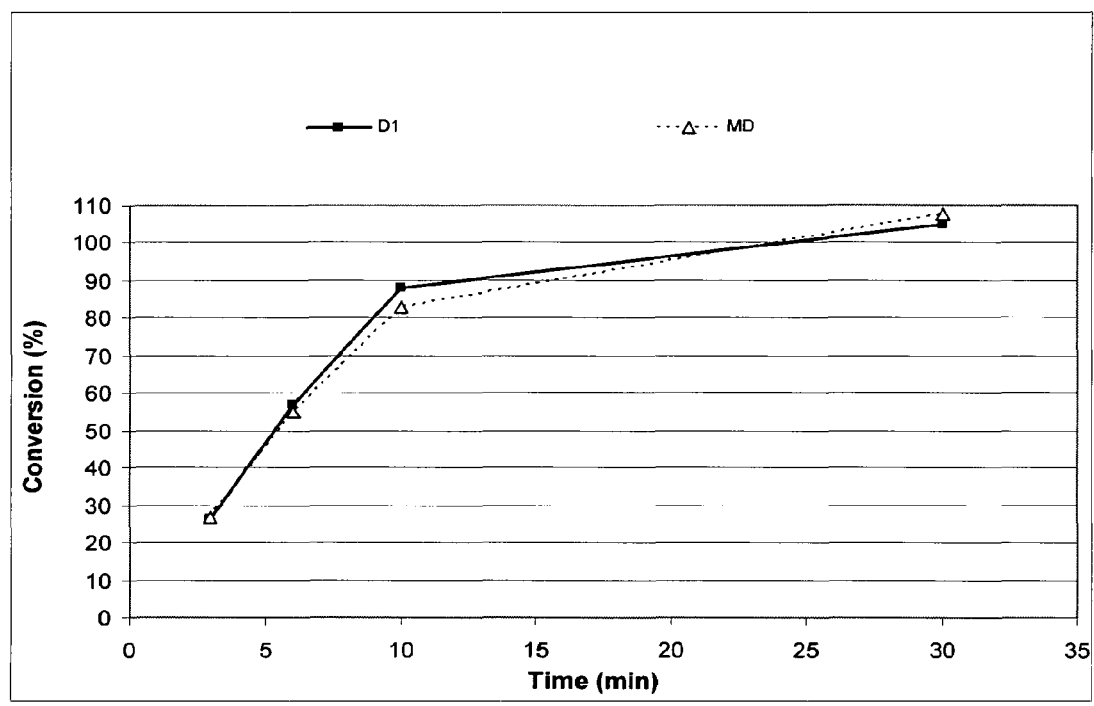
FIG. 7 is a graph illustrating kinetics for butadiene polymerization, respectively obtained with a catalytic system prepared in batch mode and a catalytic system prepared according to the continuous process of the invention with an installation corresponding to FIG. 3.

The results are given in FIG. 7.

These curves show that it is possible to have the same catalytic activity with a catalytic system prepared continuously according to the invention as with a catalytic system prepared in batch mode.

Example III

Preparation of a Concentrated Catalytic System MD2 According to a Continuous Process in Accordance with the Invention. Influence of Catalyst Concentration:

1) Preparation of the catalytic system MD2:

This catalytic system was prepared according to the process in accordance with the invention carried out in the installation shown schematically in FIG. 2. The solubilization reactor (10) is a tank mixed by means of 3 rotors equally distributed through its height and having a volume of 32.5 l. The well-mixed dynamic mixers (30) and (40) respectively intended for the alkylation and halogenation/ageing steps have respective volumes of 0.49 l and 2.75 l. The flow rate of the installation is 2.57 l/h.

The catalytic system MD2 was continuously prepared on this process, said system having the catalytic formula Nd/butadiene/DiBAH/DEAC=1/30/2/2.7 and the concentration 0.04 mol.l$^{-1}$ with respect to neodymium.

More specifically, these catalytic systems were prepared using a concentrated solution of salt NdP$_3$ in MCH at 0.136 mol.l$^{-1}$ instead of 0.025 mol.l$^{-1}$ previously used, containing an amount of free acid of 2.1% by mass (i.e. a molar excess of bis(2-ethylhexyl)phosphoric acid relative to the neodymium of 41.02%) and having a water content of 24 parts by weight per million (i.e. a molar excess of water relative to the neodymium of 0.84%). The solution thus prepared is fed into the reactor (10) maintained at 30° C., and:
- in the reactor (10), the preforming diene is added to this solution;
- in the well-mixed dynamic mixer (30), the mixture thus obtained and maintained at 30° C. is alkylated via "DiBAH", for a period of 15 min, the DiBAH concentration used being 1 mol.l$^{-1}$; then
- in the well-mixed dynamic mixer (40), the product of the alkylation reaction is halogenated and aged via "DEAC", at 60° C. and for a period of 64 min. The "DEAC" concentration used is 0.5 mol.l$^{-1}$. It should be noted that no trace of any increase in temperature is detected although the temperature of the heat-transfer fluid around the dynamic mixer (40) is kept constant.

No trace of gel appears after operating for 7 hours or more.

Figure 8:
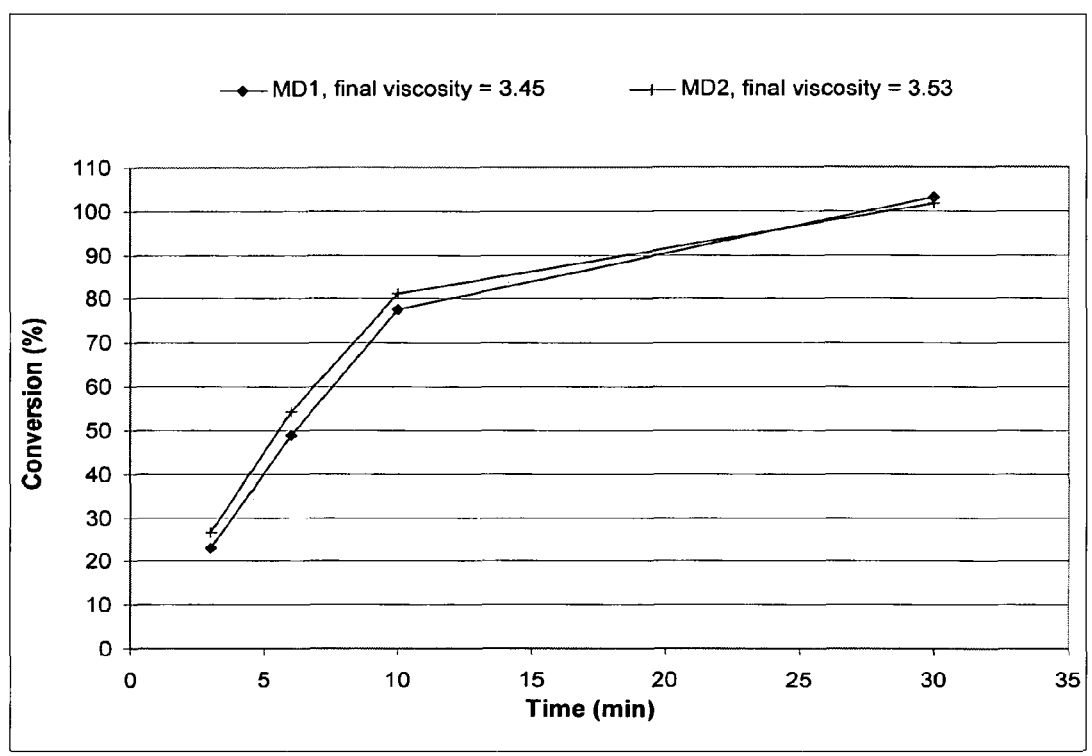
FIG. 8 is a graph illustrating kinetics for butadiene polymerization, respectively obtained with two catalytic systems prepared according to the continuous process of the invention with an installation corresponding, firstly, to FIG. 3 (MD1) and, secondly, to FIG. 2 (MD2)

2) Comparison of the catalytic systems MD1 and MD2 in butadiene polymerization:

The two catalysts are used in butadiene polymerization reactions according to the protocol strictly identical to that described in Example II. The results are reported in FIG. 8.

The concentration of the catalyst can therefore be readily modulated through the concentration of the feeds of the alkylating agent and of the neodymium salt solution. A concentrated catalyst is as active as its diluted analogue. The final characteristics of the polymer obtained themselves also remain very advantageous with regard to an application for the manufacture of tire covers. It should be noted that this process according to the invention for the continuous synthesis of the catalytic system makes it possible to satisfactorily control the exothermicity of the abovementioned preformation step even in the case of a relatively high final concentration of rare-earth element(s) in the catalytic system, due to the fact that this exothermicity can be controlled in a continuous process through better distribution of heat exchanges.

Example IV

Preparation of a Catalytic System MD3 According to a Continuous Process in Accordance with the Invention Using Two Sets of Well-Mixed Dynamic Mixers Placed in Series:

1) Preparation of the catalytic system MD3:

This catalytic system was prepared according to the process in accordance with the invention carried out in the installation shown schematically in FIG. 4. The solubilization reactor (10) is a tank mixed by means of 3 rotors distributed equally through its height and having a volume of 32.5 l. The well-mixed dynamic mixers (30a), (30b), (30c) intended for the alkylation steps (40a), (40b), (40c) intended for the halogenation-ageing step have respective volumes of 0.16 l for (30a), (30b), (30c) and 0.920 l for (40a), (40b), (40c). The flow rate of the installation is 1.93 l/h.

The catalytic system MD3 was prepared continuously on this process, said system having the catalytic formula Nd/butadiene/DiBAH/DEAC=1/30/2/2.7 and the concentration 0.02 mol.l$^{-1}$ with respect to neodymium.

More specifically, this catalytic system MD3 was prepared by:
- solubilizing the salt NdP$_3$ in MCH and adding the preforming diene, in the reactor (10), for 30 min or more at 30° C.;
- in the well-mixed dynamic mixers (30a), (30b), (30c), alkylating the mixture thus obtained and maintained at 30° C., via "DiBAH", for a period of 15 min, the DiBAH concentration used being 1 mol.l$^{-1}$; then
- in the well-mixed dynamic mixers (40a), (40b), (40c), halogenating and ageing the product of the alkylation reaction, via "DEAC", at 60° C. and for a period of 85 min. The "DEAC" concentration used is 0.5 mol.l$^{-1}$.

No trace of gel appears after the 7 hours of operation of this synthesis and beyond.

Figure 9:
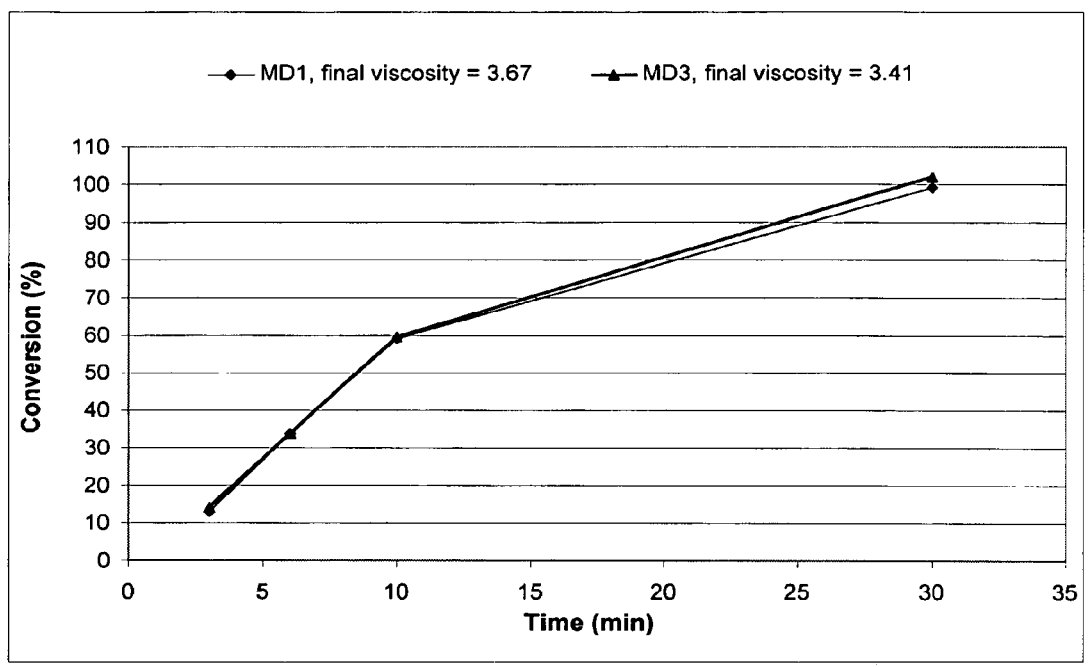
FIG. 9 is a graph illustrating kinetics for butadiene polymerization, respectively obtained with two catalytic systems prepared according to the continuous process of the invention with an installation corresponding, firstly, to FIG. 3 (MD1) and, secondly, to FIG. 4 (MD3).

2) Comparison of the Catalytic Systems MD1 and MD3:

The two catalysts are used in butadiene polymerization reactions according to the protocol strictly identical to that described in Example II. The results are reported in FIG. 9.

A catalytic activity and macrostructural and microstructural characteristics that are completely similar to those of the other catalysts in accordance with the invention are found.

Example V

Preparation of a Catalytic System MD4 with a Low DiBAH/Nd Ratio According to a Continuous Process in Accordance with the Invention:

1) Preparation of the catalytic system MD4:

This catalytic system was prepared according to the process in accordance with the invention carried out in the installation shown schematically in FIG. 1, which also comprises a device for metering powder (15), of the rare-earth salt $NdP_3$, the solubilization of which is carried out in the mixed storage reservoir (10) which has a second inlet (14) connected to the powder metering device. The solubilization reactor (10) is a tank mixed by means of 3 rotors equally distributed through its height and having a volume of 32.5 l. The well-mixed dynamic mixers (30) and (40) respectively intended for the alkylation and halogenation/ageing steps have respective volumes of 0.49 l and 2.78 l. The flow rate of the installation is 2.34 l/h.

The catalytic system MD4 was prepared continuously on this process, said system having the catalytic formula Nd/butadiene/DiBAH/DEAC=1/30/1.3/2.7 and the concentration 0.04 mol.$l^{-1}$ with respect to neodymium.

More specifically, these catalytic systems were prepared by using a concentrated solution of salt $NdP_3$ in MCH at 0.055 mol.$l^{-1}$, prepared in the reactor (10) maintained at 30° C., and by:

in the well-mixed dynamic mixer (30), adding the preforming diene to this solution;
in the well-mixed dynamic mixer (30), alkylating the mixture thus obtained and maintained at 30° C., via "DiBAH", for a period of 15 min, the DiBAH concentration used being 1 mol.$l^{-1}$; then
in the well-mixed dynamic mixer (40), halogenating and ageing the product of the alkylation reaction, via "DEAC", at 60° C. and for a period of 70 min. The "DEAC" concentration used is 0.785 mol.$l^{-1}$.

It should be noted that there is no gel formation or fouling in the installation.

2) Application of the catalytic system MD4 in butadiene polymerization:

A 250 ml "Steinie" bottle is used as polymerization reactor. The leaktightness of the bottle is ensured by an assembly of the "seal/pierced cap" type, thus allowing the addition of each catalytic system using a syringe. The polymerization reaction is carried out by subjecting this pre-washed and -dried bottle to stirring in a thermostatted waterbath.

The butadiene polymerization reaction (10 g of butadiene are used per bottle) is carried out in MCH at 30° C. and under an inert nitrogen atmosphere. A "polymerization solvent (MCH)/monomer (Btd)" ratio by mass equal to 9 was used (this ratio by mass is hereinafter referred to as S/M).

The amount of catalytic base with respect to neodymium is 1308 μmol per 100 g of butadiene.

Methanol is used, at a volume of 1 ml, as agent for stopping the polymerization reaction, and N-1,3-dimethylbutyl-N'-phenyl-p-phenylenediamine (6PPD) is used as protecting agent (at a volume of 1 ml at a concentration of 10 g.$l^{-1}$ in cyclohexane, i.e. a mass of 0.02 g).

The measurement of the degree of conversion of the butadiene to polybutadiene as a function of the reaction time is used to describe the polymerization kinetics.

The inherent viscosity ηinh at 0.1 g.$dl^{-1}$ in toluene characterizes, for its part, the macrostructure of each polybutadiene obtained.

Figure 10:
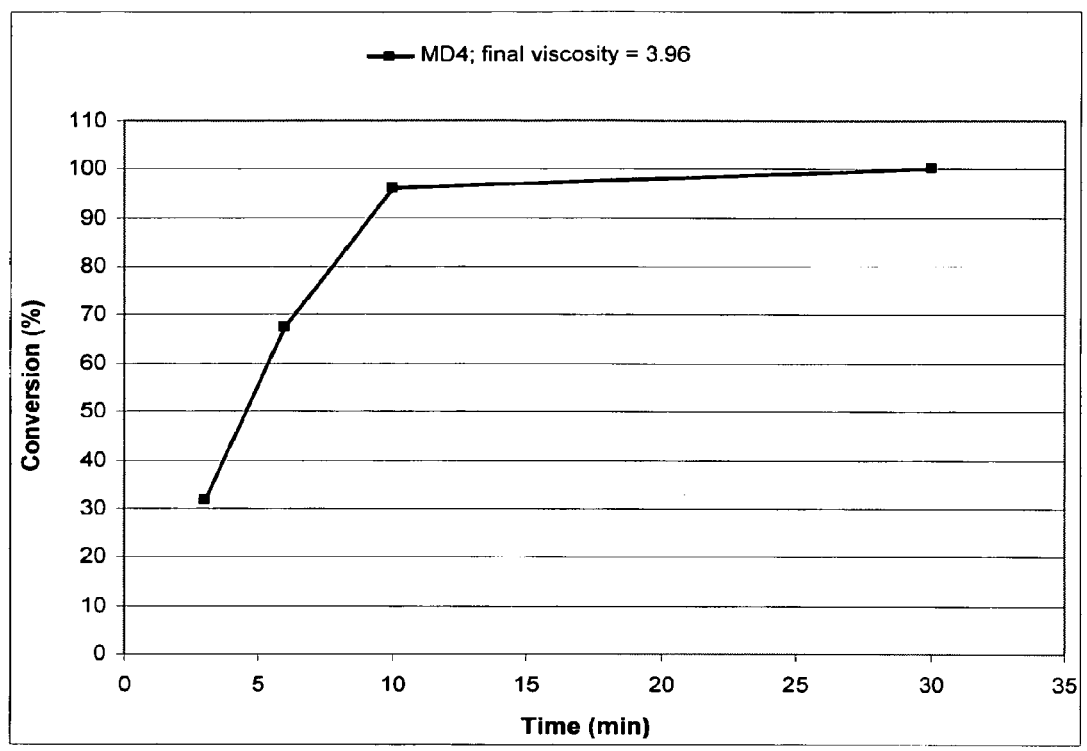
FIG. 10 is a graph showing the results of Example V.

The results are reported in FIG. 10 and Table 3.

This curve shows that a catalyst of catalytic formula Nd/butadiene/DiBAH/DEAC=1/30/1.3/2.7, prepared continuously according to the invention, has very good catalytic activity.

Example VI

Preparation of a Catalytic System D2 According to a Batch Process and of a Catalytic System MD5 Prepared According to the Continuous Process in Accordance with the Invention with a High DiBAH/Nd Ratio:

1) Preparation of the catalytic system D2:

A catalytic system D2 was prepared by following the batch-mode preparation process described in document WO 03/097708. A 250 ml "Steinie" bottle is used as synthesis reactor.

This catalytic system D2 has the following formula: Nd/butadiene/DiBAH/DEAC=1/30/12/2.7 and its concentration is 0.02 mol.$l^{-1}$.

To this effect, the neodymium salt $NdP_3$ in powder form was introduced into a 250 ml "Steinie" bottle previously cleaned to remove its impurities. This salt was then subjected to sparging with nitrogen for 10 min, and then the following successive steps were carried out:

Solubilization step: A solvent composed of methylcyclohexane (MCH) was introduced into the "Steinie" bottle containing the neodymium salt $NdP_3$ for the purpose of forming a gelatinous solution. The salt and the solvent are left in contact overnight at ambient temperature.

Preforming diene addition atep:

Next, butadiene was introduced into the "Steinie" bottle at ambient temperature.

Alkylation step:

"DiBAH" was then introduced into the "Steinie" bottle at ambient temperature, as an alkylating agent, in a concentration of approximately 1 mol.$l^{-1}$. The reaction medium immediately becomes fluid. The alkylation time is 15 min.

The temperature of the alkylation reaction is 30° C.

Halogenation step:

"DEAC" was then introduced into the "Steinie" bottle, at a concentration of approximately 0.5 mol.$l^{-1}$. The temperature of the reaction medium is then brought to 60° C. The extremely rapid rise in temperature is linked to the exotherm of the reaction, proportional to the amount of butadiene introduced into the catalyst, and to the absence of notable and simultaneous cooling by the walls of the "Steinie" bottle.

Ageing step:

Ageing of the mixture thus obtained was then carried out by maintaining this temperature of 60° C. for a period of 70 min.

Finally, the catalytic solution obtained was cooled and stored under a nitrogen atmosphere in a freezer, at a temperature of −15° C.

2) Preparation of the catalytic system MD5 according to the invention:

This catalytic system was prepared according to the process in accordance with the invention carried out in the installation used for the preparation of the catalytic system MD4 of Example V, the reservoir (10) also comprising a third inlet (16) for introducing, by a flow meter, into the storage reservoir (10), a part of the preforming conjugated diene stored in the reservoir (24) and which is equipped with an outlet (22) connected to the inlet (16) of the reservoir. The solubilization reactor (10) is a tank mixed by means of 3 rotors evenly distributed through its height and having a volume of 32.5 l. The well-mixed dynamic mixers (30) and (40) respectively intended for the alkylation and halogenation/ageing steps have respective volumes of 0.49 l and 2.78 l. The flow rate of the installation is 2.38 l/h The catalytic system MD5 was prepared continuously on this process, this system having the catalytic formula Nd/butadiene/DiBAH/DEAC=1/30/12/2.7 and the concentration 0.04 mol.l$^{-1}$ with respect to neodymium.

More specifically, these catalytic systems were prepared by using a concentrated solution of salt NdP$_3$ in MCH at 0.0972 mol.l$^{-1}$ prepared in the reactor (10) maintained at 30° C., and by:
- in the reactor (10), adding the preforming diene to this solution;
- in the well-mixed dynamic mixer (30), alkylating the mixture thus obtained and maintaining at 30° C., via "DiBAH", for a period of 15 min, the DiBAH concentration used being 1 mol.l$^{-1}$; then
- in the well-mixed dynamic mixer (40), halogenating and ageing the product of the alkylation reaction, via "DEAC", at 60° C. and for a period of 70 min. The "DEAC" concentration used is 0.785 mol.l$^{-1}$.

It should be noted that there is no gel formation or fouling in the installation.

3) Comparison of the catalytic systems D2 and MD5 in butadiene polymerization:

The two catalysts are used in butadiene polymerization reactions according to the protocol strictly identical to that described in Example V. The amount of catalytic base with respect to neodymium is 192 μmol per 100 g of butadiene for D2 and 231 μmol per 100 g of butadiene for MD5.

Figure 11:
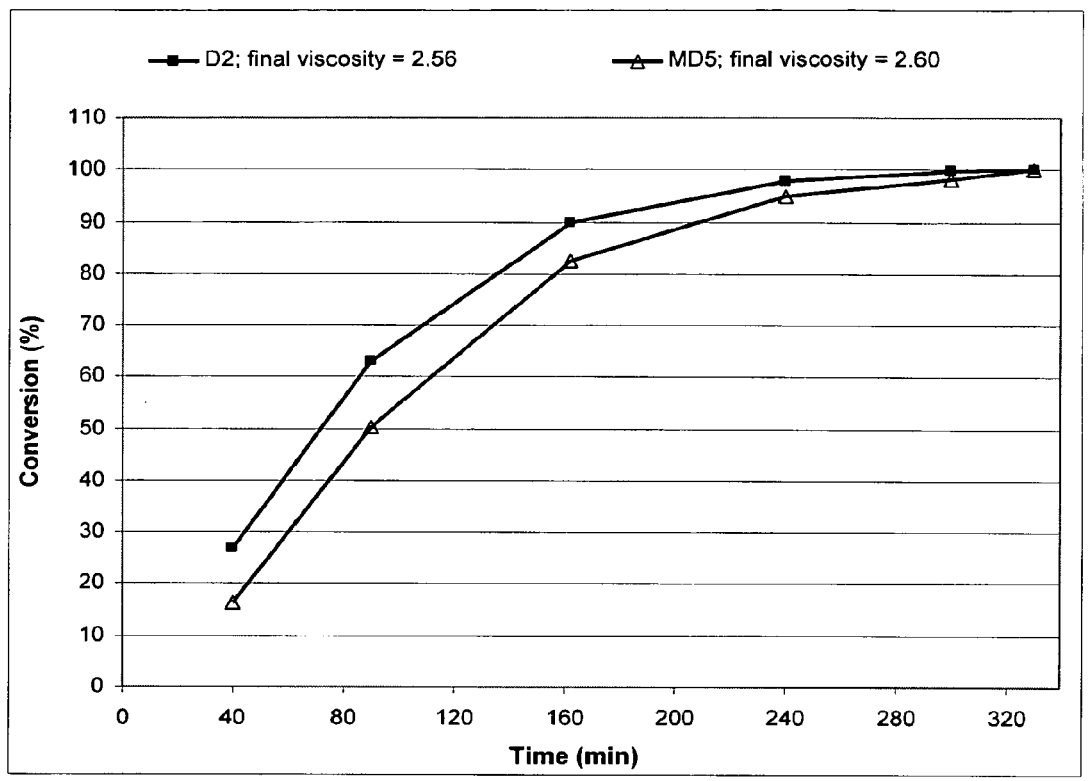
FIG. 11 is a graph showing the results of Example VI.

The results are reported in FIG. 11 and Table 4.

These curves show that, for catalysts of catalytic formula Nd/butadiene/DiBAH/DEAC=1/30/12/2.7, it is possible to have a final activity equivalent to isoviscosity of the polymer with a catalytic system prepared in continuous mode according to the invention and a catalytic system of the same catalytic formula prepared in batch mode.

By combining the results of the present example with those of Example V, it appears that the DiBAH/Nd ratio of the catalysts prepared in continuous mode according to the invention can vary over a wide range.

Example VII

Preparation of a Catalytic System MD6 Prepared According to the Continuous Process in Accordance with the Invention and Comparison with the Low-Alkylation-Time Catalytic System MD7 also Prepared According to the Continuous Process not in Accordance with the Invention:

1) Preparation of the catalytic system MD6:

This catalytic system was prepared according to the process net in accordance with the invention carried out in the installation used for the preparation of the catalytic system MD5 of Example V. The solubilization reactor (10) is a tank mixed by means of 3 rotors evenly distributed through its height and having a volume of 32.5 l. The well-mixed dynamic mixers (30) and (40) respectively intended for the alkylation and halogenation/ageing steps have respective volumes of 0.49 l and 2.78 l. The flow rate of the installation is 2.34 l/h.

The catalytic system MD6 was prepared continuously on this process, this system having the catalytic formula Nd/butadiene/DiBAH/DEAC=1/30/2/2.7 and the concentration 0.04 mol.l$^{-1}$ with respect to neodymium.

More specifically, these catalytic systems were prepared by using a concentrated solution of salt NdP$_3$ in MCH at 0.057 mol.l$^{-1}$, prepared in the reactor (10) maintained at 30° C., and by:
- in the well-mixed dynamic mixer (30), adding the preforming diene to this solution;
- in the well-mixed dynamic mixer (30), alkylating the mixture thus obtained and maintained at 30° C. via "DiBAH", for a period of 15 min, the DiBAH concentration used being 1 mol.l$^{-1}$; then
- in the well-mixed dynamic mixer (40), halogenating and ageing the product of the alkylation reaction, via "DEAC", at 60° C. and for a period of 70 min. The "DEAC" concentration used is 0.785 mol.l$^{-1}$.

It should be noted that there is no gel formation or fouling in the installation.

2) Preparation of the catalytic system MD7:

This catalytic system was prepared according to the process not in accordance with the invention carried out in the installation used for the preparation of the catalytic system MD5 of Example V. The solubilization reactor (10) is a tank mixed by means of 3 rotors evenly distributed through its height and having a volume of 32.5 l. The well-mixed dynamic mixers (30) and (40) respectively intended for the alkylation and halogenation/ageing steps have respective volumes of 0.49 l and 2.78 l. The flow rate of the installation is 11.1 l/h. 'The catalytic system MD7 was prepared continuously on this process, said system having the catalytic formula Nd/butadiene/DiBAH/DEAC=1/30/2/2.7 and the concentration 0.04 mol.l$^{-1}$ with respect to neodymium.

More specifically, these catalytic systems were prepared by using a concentrated solution of salt NdP$_3$ in MCH at 0.0508 mol.l$^{-1}$, prepared in the reactor (10) maintained at 30° C., and by:
- in the solubilization reactor (10), adding the preforming diene to this solution;
- in the well-mixed dynamic mixer (30), alkylating the mixture thus obtained and maintained at 30° C., via "DiBAH", for a period of 3 min, the DiBAH concentration used being 1 mol.l$^{-1}$; then
- in the well-mixed dynamic mixer (40), halogenating and ageing the product of the alkylation reaction, via "DEAC", at 60° C. and for a period of 15 min. The "DEAC" concentration used is 0.785 mol.l$^{-1}$.

It should be noted that there is no gel formation or fouling in the installation.

Figure 12:
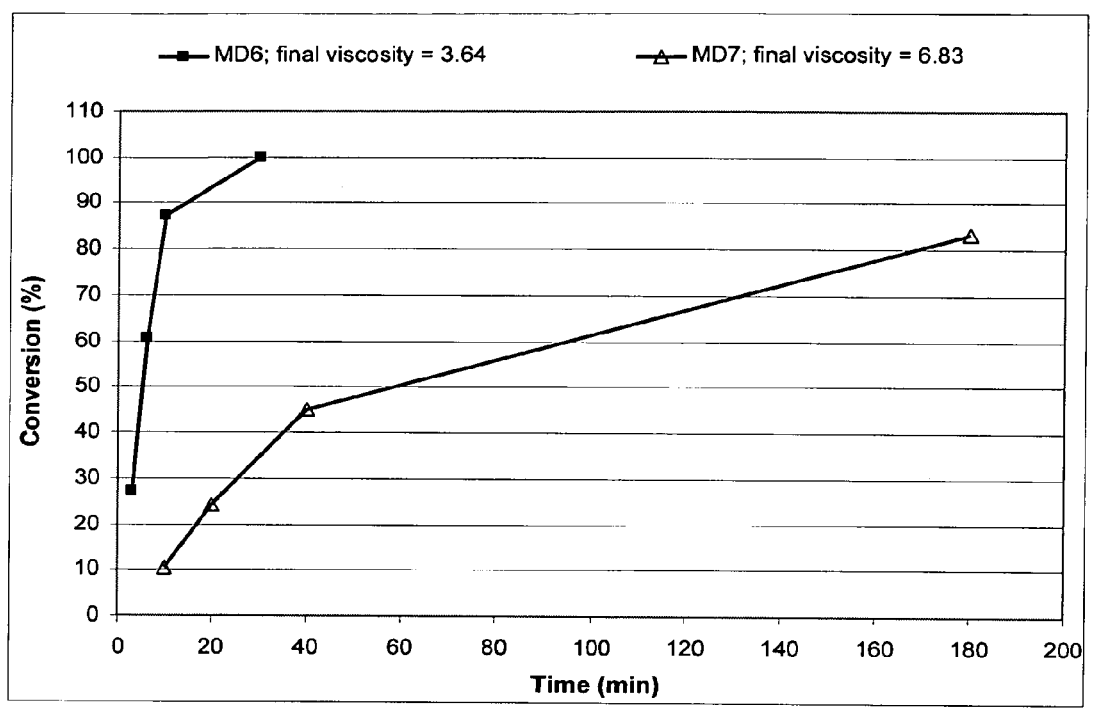
FIG. 12 is a graph showing the results of Example VII.

2) Comparison of the catalytic systems MD6 and MD7 in butadiene polymerization:

The two catalysts are used in butadiene polymerization reactions according to the protocol strictly identical to that described in Example V. The amount of catalytic base with respect to neodymium is 846 μmol per 100 g of butadiene. The results are reported in FIG. 12 and Table 5.

These curves show that, for the same amount of catalytic base with respect to neodymium used in the polymerization, the catalytic system MD7 alkylated for 3 min has a catalytic activity that is much lower than that of the catalytic system MD6 prepared according to the invention. The macrostructural characteristics of the polymer obtained with the catalytic system MD7 are also highly degraded: the polydispersity index is very high. They are absolutely unacceptable in terms of an application for the manufacture of tire covers.

Finally, it should be noted that the catalytic system MD7 is heterogeneous, exhibiting in particular a great deal of deposit. This is also absolutely unacceptable in terms of an industrial application since this insoluble phase could generate blockages of the manufacturing process.

Example VIII

Preparation of a Catalytic System D3 According to a Batch Process and Comparison in Isoprene Polymerization with the Catalytic System MD6 Prepared According to the Continuous Process in Accordance with the Invention:

1) Preparation of the catalytic system D3:

A catalytic system D3 was prepared by following the batch-mode preparation process described in the abovementioned document WO 02/38636.

This catalytic system D3 has the following formula: Nd/butadiene/DiBAH/DEAC=1/30/2/2.7 and its concentration is 0.02 mol.l$^{-1}$.

To this effect, a solvent composed of methylcyclohexane (MCH) was poured into a 25 l batch reactor previously cleaned to remove its impurities. Next, this solvent was subjected to nitrogen sparging for 3 min, then the following successive steps were carried out:

Solubilization step:

For the purpose of forming a gelatinous solution, the neodymium salt NdP$_3$ in powder form was introduced into the reactor containing the solvent; the duration and the temperature for bringing the solvent into contact with the salt after further sparging for 3 minutes are, respectively, 30 minutes at 30° C.

Preforming diene addition step:

Next, butadiene was introduced into this reactor at a temperature of 30° C.

Alkylation step:

"DiBAH" was then introduced, as an alkylating agent, into this reactor maintained at 30° C., in a concentration of approximately 1 mol.l$^{-1}$. The reaction medium immediately becomes fluid. The alkylation time is 15 min. The temperature of the alkylation reaction was 30° C.

Halogenation step:

"DEAC" was then introduced into this reactor in a concentration of approximately 0.5 mol.l$^{-1}$. The temperature of the reaction medium was then brought to 60° C. The extremely rapid rise in temperature is related to the exotherm of the reaction, proportional to the amount of butadiene introduced into the catalyst, and to the absence of notable and simultaneous cooling by the walls of the reactor.

Ageing step:

Ageing of the mixture thus obtained was then carried out by maintaining this temperature of 60° C. for a period of 70 min.

Finally, the catalytic solution obtained was cooled and stored under a nitrogen atmosphere in a freezer at a temperature of −15° C.

2) Comparison of the catalytic systems D3 and MD6 in isoprene polymerization:

A 250 ml "Steinie" bottle is used as polymerization reactor. The leaktightness of the bottle is ensured by an assembly of the "seal-pierced cap" type, thus allowing the addition of each catalytic system using a syringe. Each polymerization reaction is carried out by subjecting this pre-washed and -dried bottle to stirring in a thermostatted waterbath.

This isoprene polymerization reaction (10 g of isoprene are used per bottle) is carried out in MCH at 30° C. and under an inert nitrogen atmosphere. A "polymerization solvent (MCH)/monomer (Isop)" ratio by mass equal to 9 was used (this ratio by mass is hereinafter referred to as S/M).

The amount of catalytic base with respect to neodymium is 392 μmol per 100 g of butadiene for D3 and 471 μmol per 100 g of butadiene for MD6.

Methanol is used at a volume of 1 ml as agent for stopping the polymerization reaction, and N-1,3-dimethylbutyl-N'-phenyl-p-phenylenediamine (6PPD) is used as protecting agent (at a volume of 1 ml at a concentration of 10 g.l$^{-1}$ in cyclohexane, i.e. a mass of 0.02 g).

The measurement of the degree of conversion of the isoprene to polyisoprene as a function of the reaction time is used to describe the polymerization kinetics.

The inherent viscosity ηinh at 0.1 g.dl$^{-1}$ in toluene characterizes, for its part, the macrostructure of each polybutadiene obtained.

Figure 13:
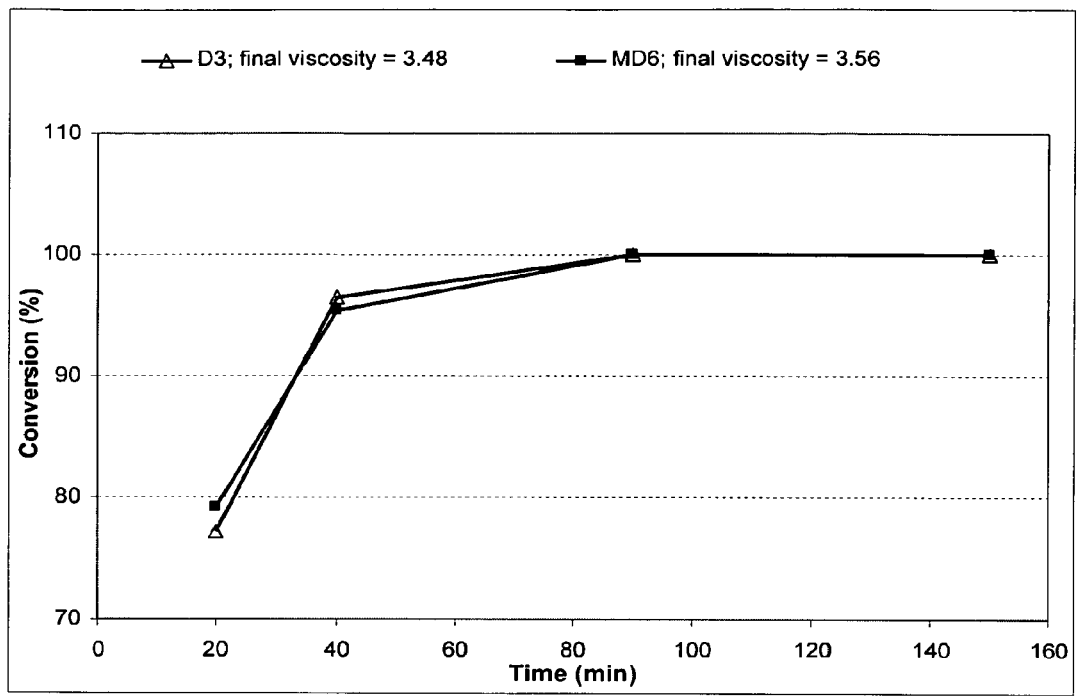
FIG. 13 is a graph showing the results of Example VIII.

The results are given in FIG. 13 and Table 6.

These curves show that, in isoprene polymerization, a catalytic activity and macrostructural and microstructural characteristics are found that are equivalent between a catalytic system prepared in continuous mode according to the invention and a catalytic system prepared in batch mode.

APPENDIX 1

Determination of the Microstructure of the Polybutadienes and Polyisoprenes Obtained The near-infrared (NIR) assay technique was used. This is an indirect method requiring "control" elastomers whose microstructure has been measured by the $^{13}$C NMR technique. The quantitative relationship (Beer-Lambert law) that exists between the distribution of monomers in an elastomer and the shape of the elastomer NIR spectrum are used. This technique is carried out in two steps:

1) Calibration:

The respective spectra of the "control" elastomers are acquired.

A mathematical model is established associating one microstructure with a given spectrum, this being done using the method of partial least squares (PLS) regression that relies on a factorial analysis of the spectral data. The following two documents relate, in an in-depth manner, to the theory and use of this method for analysing "multivariant" data:

(1) P. Geladi and B. R. Kowalski

"Partial Least Squares regression: a tutorial"

*Analytica Chimica Acta*, vol. 185, 1-17 (1986).

(2) M. Tenenhaus

"La régression PLS-Théorie and pratique" (PLS regression-theory and practice)

Paris, Editions Technip (1998).

2) Measurement:

The spectrum of the sample was recorded.

The microstructure was calculated.

APPENDIX 2

Determination of the Molar Weight Distribution of the Polybutadienes Obtained via the Size Exclusion Chromatography (SEC) Technique.

a) Measurement principle:

Size exclusion chromatography (SEC) makes it possible to physically separate the macromolecules in solution according to their size through columns filled with a porous gel. The macromolecules are separated according to their hydrodynamic volume, those with the largest volumes being eluted first.

Without being an absolute method, SEC allows the molecular weight distribution of a polymer to be assessed. The various number-average ($M_n$) and weight-average ($M_w$) molecular weights may be determined and the polydispersity index (Ip=$M_w$/$M_n$) calculated, via a Moore calibration, from commercial standards.

b) Preparation of the polymer:

There is no particular treatment of the polymer sample before analysis. It is simply dissolved in tetrahydrofuran at a concentration of around 1 g/l.

c) SEC analysis:

Case c1) The equipment used is a Waters Alliance chromatographic system. The eluting solvent is tetrahydrofuran, the flow rate is 1 ml/min, the temperature of the system is 35° C. and the analysis time is 30 min. A set of two Waters columns having the commercial name Styragel HT6E is used.

The injected volume of the polymer sample solution is 100 µl. The detector is a Waters 2140 differential refractometer and the software for processing the chromatographic data is the Waters Millennium system.

Case c2) The equipment used is a Waters Alliance chromatograph. The eluting solvent is tetrahydrofuran, the flow rate is 0.7 min, the temperature of the system is 35° C. and the analysis time is 90 min. A set of four Waters columns is used in series, the columns having the commercial names Styragel HMW7, Styragel HMW6E and Styragel HT6E (two columns).

The injected volume of the polymer sample solution is 100 µl. The detector is a Waters model RI32X differential refractometer and the software for processing the chromatographic data is the Waters Millennium system.

In both cases, the average molecular weights calculated are relative to a calibration curve produced for polybutadienes with the following microstructure: 11% by weight of type 1,2 units and 48% by weight of type trans-1,4 units.

The invention claimed is:

1. A process for continuous preparation of a catalytic system that can be used for polymerization of at least one conjugated diene monomer, said catalytic system being based on at least:
- a preforming conjugated diene;
- an organic phosphoric acid salt of one or more rare-earth element(s), said salt being in solution in at least one saturated aliphatic or alicyclic and inert hydrocarbon-based solvent;
- an alkylating agent comprising an alkylaluminium having the formula $AlR_3$ or $HAlR_2$, in which R represents an alkyl radical, and H represents a hydrogen atom; and
- a halogen donor comprising an alkylaluminium halide; which comprises successively in one line:
  (i) an alkylation reaction between the preforming conjugated diene, with a solution of the salt of rare-earth element(s) and the alkylating agent, the alkylation reaction being carried out for a period of at least 5 minutes in an alkylation reactor composed of at least one well-mixed dynamic mixer; and
  (ii) addition of said halogen donor to the mixture obtained in (i) that has been removed from the alkylation reactor, and introduction of the mixture obtained in (i) to a continuous halogenation-ageing reactor, to produce a reaction for halogenation-ageing of the preformed catalytic system and to continuously produce said preformed catalytic system at an outlet of said line.

2. The process according to claim 1, wherein all of the preforming conjugated diene, of the solution of rare-earth element(s) and of the alkylating agent, are introduced directly into the alkylation reactor.

3. The process according to claim 1, which comprises, prior to step (i), bringing said solvent(s) and said salt into contact in a solubilization reactor.

4. The process according to claim 3, which comprises introducing said salt and then said solvent(s) into said solubilization reactor.

5. The process according to claim 3, which comprises introducing all or a part of the preforming conjugated diene into said solubilization reactor.

6. The process according to claim 3, wherein the solution of the salt of rare-earth element(s) evacuated from the solubilization reactor is subsequently brought into contact, in the line, with all or a part of the preforming conjugated diene.

7. The process according to claim 6, which comprises introducing all or a part of the preforming conjugated diene into a well-mixed dynamic mixer.

8. The process according to claim 3, wherein the temperature of said solubilization reactor is controlled at a temperature ranging from 10° C. to 100° C.

9. The process according to claim 8, wherein the temperature of said solubilization reactor is controlled in such a way that it is approximately equal to 30° C.

10. The process according to claim 3, wherein the continuous bringing into contact, with mixing in said line, of said solution of the salt of rare-earth element(s) with said preforming conjugated diene is carried out at a controlled temperature ranging from 10° C. to 60° C.

11. The process according to claim 10, wherein the continuous bringing into contact, with mixing in said line, of said solution of the salt of rare-earth element(s) with said preforming conjugated diene is carried out at a controlled temperature approximately equal to 30° C.

12. The process according to claim 1, wherein the solution of the salt of rare-earth element(s) is diluted in the line.

13. The process according to claim 12, wherein the dilution is carried out before or after a feed pump for the line located upstream of the alkylation reactor.

14. The process according to claim 1, wherein said catalytic system comprises said rare-earth element(s) in a concentration ranging from 0.002 mol/l to 0.08 mol/l.

15. The process according to claim 1, wherein step (i) is carried out at a controlled temperature ranging from 25° C. to 80° C. and for a period ranging from 10 to 60 minutes.

16. The process according to claim 15, wherein step (i) is carried out at a controlled temperature approximately equal to 30° C. and for a period approximately equal to 15 minutes.

17. The process according to claim 16, which comprises controlling the residence time of said alkylating agent into said line, before adding said halogen donor.

18. The process according to claim 17, wherein said controlling of the residence time in the alkylation reactor comprises controlling the size and/or the number and/or the volume of the tank(s) of the well-mixed dynamic mixer(s).

19. The process according to claim 15 wherein the halogen donor is introduced into the line before the halogenation-ageing reactor.

20. The process according to claim 15, which comprises, following step (i), continuously bringing into contact, in the halogenation-ageing reactor, the product of said alkylation reaction with said halogen donor, at a controlled temperature ranging from 40° C. to 80° C. and for a period ranging from 10 minutes to 2 hours.

21. The process according to claim 20, which comprises, following step (i), continuously bringing into contact, in the halogenation-ageing reactor, the product of said alkylation reaction with said halogen donor, at a controlled temperature approximately equal to 60° C. and for a period approximately equal to 60 minutes.

22. The process according to claim 20, which comprises controlling the residence time of the ageing in said line by controlling the size and/or the number and/or the volume of the tank(s) of the well-mixed dynamic mixer(s) and/or of one or more tubular reactor(s).

23. The process according to claim 14, which comprises, prior to step (i), continuously bringing into contact, with mixing in the line, said salt of rare-earth element(s) prepared directly in the solvent with said preforming conjugated diene at a controlled temperature ranging from 10° C. to 60° C.

24. The process according to claim 14, wherein said catalytic system comprises said rare-earth element(s) in a concentration ranging from 0.02 mol/l to 0.04 mol/l.

25. The process according to claim 1, wherein said catalytic system is stored downstream of said line at a temperature greater than −25° C. and less than or equal to +20° C.

26. The process according to claim 1, wherein said alkylating agent is diisobutylaluminium hydride.

27. The process according to claim 1, wherein said halogen donor is an alkylaluminium monohalide.

28. The process according to claim 1, wherein said salt is a tris[bis(2-ethylhexyl)phosphate] of rare-earth element(s).

29. The process according to claim 26, wherein the (alkylating agent/salt) molar ratio has a value ranging from 1.3 to 15.

30. The process according to claim 29, wherein the (alkylating agent/salt) molar ratio has a value equal to 2.

31. The process according to claim 1, wherein the (halogen/salt) molar ratio has a value ranging from 2 to 3.5.

32. The process according to claim 1, wherein the (preforming conjugated diene/salt) molar ratio has a value ranging from 15 to 70.

33. A process for continuous preparation of a polymer of at least one conjugated diene using a continuously catalytic system, comprising:
   continuously preparing a catalytic system for polymerization of at least one conjugated diene monomer according to claim 1;
   continuously feeding at least one conjugated diene monomer to a polymerization reactor; and
   feeding the catalytic system for polymerization of at least one conjugated diene monomer into the polymerization reactor.

34. The process according to claim 33, wherein the catalytic system is prepared continuously with an installation comprising:
   (i) a continuous alkylation reactor which is composed of one or more, (n), continuous alkylation, well-mixed dynamic mixer(s);
   (ii) a continuous halogenation-ageing reactor which comprises one or more, (n'), well-mixed dynamic mixer(s) and optionally one or more, (n"), plug-flow tubular reactor(s) connected to the outlet of the line
   (n) and (n') being an integer greater than 0 and n" being equal to 0 or an integer greater than 0.

* * * * *